United States Patent
Alspector et al.

(10) Patent No.: US 9,171,070 B2
(45) Date of Patent: Oct. 27, 2015

(54) METHOD FOR CLASSIFYING UNKNOWN ELECTRONIC DOCUMENTS BASED UPON AT LEAST ONE CLASSIFICATON

(75) Inventors: Joshua Alspector, Chantilly, VA (US); Abdur R. Chowdhury, Oakton, VA (US); Aleksander Kolcz, Fairfax, VA (US)

(73) Assignee: FACEBOOK, INC., Menlo Park, CA (US)

( * ) Notice: Subject to any disclaimer, the term of this patent is extended or adjusted under 35 U.S.C. 154(b) by 471 days.

(21) Appl. No.: 13/612,841

(22) Filed: Sep. 13, 2012

(65) Prior Publication Data

US 2013/0173562 A1 Jul. 4, 2013

Related U.S. Application Data

(63) Continuation of application No. 12/780,500, filed on May 14, 2010, now Pat. No. 8,713,014, which is a continuation of application No. 11/016,930, filed on Dec. 21, 2004, now Pat. No. 7,725,475.

(60) Provisional application No. 60/580,378, filed on Jun. 18, 2004, provisional application No. 60/562,298, filed on Apr. 15, 2004, provisional application No. 60/543,283, filed on Feb. 11, 2004.

(51) Int. Cl.
G06F 17/30 (2006.01)
H04L 12/58 (2006.01)
G06N 5/02 (2006.01)

(52) U.S. Cl.
CPC .... *G06F 17/30705* (2013.01); *G06F 17/30156* (2013.01); *G06F 17/30707* (2013.01); *G06N 5/02* (2013.01); *H04L 12/585* (2013.01); *H04L 51/12* (2013.01)

(58) Field of Classification Search
CPC .................... G06F 17/30598; G06F 17/30705
See application file for complete search history.

(56) References Cited

U.S. PATENT DOCUMENTS 5,463,773 A 10/1995 Sakakibara et al.
5,619,709 A 4/1997 Caid et al.
(Continued)

OTHER PUBLICATIONS

Androutsopoulos et al., An Evaluation of Naïve Bayesian Anti-Spam Filtering, Proceedings of the Workshop on Machine Learning in the New Information Age: 11th European Conference on Machine Learning (ECML 2000), G. Potamias, V. Moustakis, and M. van Someren, eds., 2000, pp. 9-17.

(Continued)

*Primary Examiner* — Robert Beausoliel, Jr.
*Assistant Examiner* — Nirav K Khakhar
(74) *Attorney, Agent, or Firm* — Keller Jolley Preece

(57) ABSTRACT

A classification system includes a signature-based duplicate detector and an inductive classifier that share attribute information. To perform the duplicate detection and the classification, the duplicate detector and inductive classifier are first initialized by generating a lexicon of attributes for the duplicate detector and a classification model for the classifier. To develop a classification model, a training set of documents of known class are used by the classifier to determine the attributes of the documents that are most useful in classifying an unknown document. The model is developed from these attributes. Attribute information containing the attributes determined by the classifier is then passed to the duplicate detector and the duplicate detector uses the attribute information to generate the lexicon of attributes.

21 Claims, 13 Drawing Sheets

(56) References Cited

U.S. PATENT DOCUMENTS

| | | | |
|---|---|---|---|
| 5,675,710 | A | 10/1997 | Lewis |
| 6,621,930 | B1 | 9/2003 | Smadja |
| 6,658,423 | B1 | 12/2003 | Pugh et al. |
| 7,047,242 | B1 | 5/2006 | Ponte |
| 7,139,756 | B2 | 11/2006 | Cooper et al. |
| 7,392,262 | B1 | 6/2008 | Alspector et al. |
| 7,568,148 | B1 | 7/2009 | Bharat et al. |
| 7,624,274 | B1 | 11/2009 | Alspector et al. |
| 7,725,475 | B1 | 5/2010 | Alspector et al. |
| 7,984,029 | B2 | 7/2011 | Alspector et al. |
| 8,429,178 | B2 | 4/2013 | Alspector et al. |
| 2002/0103809 | A1 | 8/2002 | Starzl et al. |
| 2003/0046297 | A1 | 3/2003 | Mason |
| 2003/0221166 | A1 | 11/2003 | Farahat et al. |
| 2003/0225763 | A1 | 12/2003 | Guilak et al. |
| 2005/0050150 | A1 | 3/2005 | Dinkin |
| 2005/0060643 | A1 | 3/2005 | Glass et al. |
| 2005/0086224 | A1 | 4/2005 | Franciosa et al. |
| 2005/0091319 | A1 | 4/2005 | Kirsch |
| 2006/0294077 | A1 | 12/2006 | Bluhm |
| 2013/0007026 | A1 | 1/2013 | Alspector et al. |
| 2013/0173518 | A1 | 7/2013 | Alspector et al. |
| 2013/0173563 | A1 | 7/2013 | Alspector et al. |

OTHER PUBLICATIONS

Bilenko et al., Learning to Combine Trained Distance Metrics for Duplicate Detection in Databases, Tech. Rep. A1 02-296, Artificial Intelligence Lab, University of Texas at Austin, 2002, pp. 1-19.
Breiman, Bagging Predictors, Machine Learning, 24 (1996), pp. 123-140.
Brin et al., Copy Detection Mechanisms for Digital Documents. Proceeding of Sigmod, 1995, pp. 398-409.
Broder, On the Resemblance and Containment of Documents, SEQS: Sequences '97, 1998, pp. 21-29.
Broder et al., Syntactic Clustering of the Web, Computer Networks and ISDN Systems 29, 1997, pp. 1157-1166.
Buckley et al., The Smart/Empire Tipster IR System, Proceedings— Tipster Text Program Phase III, 2000, pp. 107-121.
Chowdhury et al., Collection Statistics for Fast Duplicate Document Detection, ACM Transactions on Information Systems, 20 (2002), pp. 171-191.
Cooper et al., A Novel Method for Detecting Similar Documents, Proceedings of the 35th, Hawaii International Conference on System Sciences, 2002.
Graham-Cummings, The Spammers' Compendium. Proceedings of the Spam Conference, Jan. 17, 2003, pp. 1-17.
Gionis et al., Similarity Search in High Dimensions via Hashing, Proceedings of the 25th International Conference on Very Large Databases (VLDB), 1999, pp. 518-529.
Fetterly et al., On the Evolution of Clusters of Near-Duplicate Web Pages, Proceedings of the First Latin American Web Congress, 2003, pp. 37-45.
Fawcett, "In Vivo" Spam Filtering: A Challenge Problem for KDD, SIGKDD Explorations, vol. 5, Issue 2, (2003), pp. 140-148.
Drucker et al., Support Vector Machines for Spam Categorization, IEEE Transactions on Neural Networks, vol. 10, No. 5, Sep. 1999, pp. 1048-1054.
Hall, A Countermeasure to Duplicate-Detecting Anti-Spam Techniques, AT&T Labs Technical Report 99.9.1, AT&T Corp., 1999, pp. 1-26.
Haveliwala et al., Scalable Techniques for Clustering the Web, Proceedings of WebDB 2000, 2000.
Heintze, Scalable Document Fingerprinting, The USENIX Association, Proceedings of the Second USENIX Workshop on Electronic Commerce, Nov. 1996, pp. 191-200.
Hernandez, et al., The Merge/Purge Problem for Large Databases, Proceedings of the Sigmod Conference, 1995, pp. 127-138.
Hoad et al., Methods for Indentifying, Versioned and Plagiarised Documents, Journal of the American Society for Information Science and Technology, 2002, pp. 203-215.
Ilyinsky et al., An Efficient Method to Detect Duplicates of Web Documents with the Use of Inverted Index, Proceedings of the Eleventh International World Wide Web Conference, 2002.
Kleinberg, Bursty and Hierarchical Structure in Streams, Proceedings of the Eighth ACM SIGKDD International Conference on Knowledge Discovery and Data Mining (KDD-2002), 2002, pp. 1-25.
Kolcz et al., Data Duplication: An Imbalance Problem ?, Proceedings of the ICML '2003 Workshop on Learning from Imbalanced Datasets (11), 2003.
Kolcz et al., SVM-Based Filtering of E-Mail Spam with Content-Specific Misclassification Costs, Proceedings of the Workshop on Text Mining (TextDM'2001), 2001, pp. 1-14.
Kwok, A New Method Weighting Query Terms for Ad-Hoc Retrieval, Computer Science Department, Queens College, City University of New York, Flushing NY, 1996.
McCallum et al., Efficient Clustering of High Dimensional Data Sets with Application to Reference Matching, Proceedings of Sixth ACM SIGKDD International Conference on Knowledge Discovery and Data Mining (KDD-2000), 2000.
Robertson et al., Okaipi at Trec-7: Automatic Ad-Hoc, Filtering, VLC and Interactive, Proceedings of the 7th Text Retrieval Conference, 1998, pp. 253-264.
Sahami et al., A Bayesian Approach to Filtering Junk E-mail, Proceedings of the AAAI-98 Workshop on Learning for Text Categorization, 1998.
Salton et al., A Vector-Space Model for Information Retrieval, Communications of the ACM, vol. 18, No. 11, Nov. 1975, 613-620.
Sanderson et al., Duplicate Detection In, The Reuters Collection, Tech. Rep. TR-1997-5, Department of Computing Science, University of Glasgow, 1997, pp. 11.
Shivakumar et al., Finding Near-Replicas of Documents on the Web, WebDB: International Workshop on the World Wide Web and Databases, WebDB, LNCS, 1999.
Singhal et al., Pivoted Document Length Normalization, Proceedings of the Nineteenth Annual International ACM SIGIR Conference on Research and Development in Information Retrieval, 1996.
Winkler et al., The State of Record Linkage and Current Research Problems, Tech. Rep., Statistical Research Division, U.S. Bureau of Census, Washington DC, 1999.
Androutsopoulos et al., Learning to Filter Unsolicited Commercial E-Mail. Technical Report 2004/2, NCSR Demokritos, 2004, pp. 1-52.
Baker et al., Distribution Clustering of Words for Text Classification. Proceedings of SIGIR-98, 21st ACM International Conference on Research and Development in Information Retrieval, 1998, pp. 96-103.
Carreras et al, Boosting Trees for Anti-Spam Email Filtering, Proceedings of RANLP-01, 4th International Conference on Recent Advances in Natural Language Processing, Tzigov Chark, BG, 2001.
Slonim et al., The Power of Word Clusters for Text Classification, 23rd European Colloquium on Information Retrieval Research, 2001, pp. 1-12.
Yerazunis, Sparse Binary Polynomial Hashing and the CRM114 Discriminator, MIT Spam Conference, 2003.
Zhou et al., Approximate Object Location and Spam Filtering on Peer-to-Peer Systems, Proceedings of ACM/IFIP/USENIX International Middleware Conference (Middleware 2003), 2003, pp. 1-20.
Conrad et al., "Online Duplicate Document Detection Signature Reliability in a Dynamic Retrieval Environment", Copyright 2003 ACM.
U.S. Appl. No. 11/016,928, Sep. 2, 2008, Office Action.
U.S. Appl. No. 11/016,928, Mar. 19, 2009, Office Action.
U.S. Appl. No. 11/016,928, Jul. 13, 2009, Notice of Allowance.
U.S. Appl. No. 11/016,930, May 24, 2007, Office Action.
U.S. Appl. No. 11/016,930, Dec. 11, 2007, Office Action.
U.S. Appl. No. 11/016,930, Feb. 22, 2008, Office Action.
U.S. Appl. No. 11/016,930, Sep. 26, 2008, Office Action.
U.S. Appl. No. 11/016,930, Apr. 7, 2009, Office Action.
U.S. Appl. No. 11/016,930, Jan. 12, 2010, Notice of Allowance.
U.S. Appl. No. 11/016,959, May 31, 2007, Office Action.
U.S. Appl. No. 11/016,959, Dec. 13, 2007, Notice of Allowance.
U.S. Appl. No. 12/144,021, Oct. 26, 2010, Office Action.

(56) References Cited

OTHER PUBLICATIONS

U.S. Appl. No. 12/144,021, Mar. 17, 2011, Notice of Allowance.
U.S. Appl. No. 12/780,500, Nov. 22, 2010, Office Action.
U.S. Appl. No. 12/780,500, May 11, 2011, Office Action.
U.S. Appl. No. 12/780,500, Oct. 9, 2013, Notice of Allowance.
U.S. Appl. No. 13/185,238, Mar. 29, 2012, Office Action.
U.S. Appl. No. 13/185,238, Oct. 17, 2012, Notice of Allowance.
U.S. Appl. No. 13/185,238, Feb. 4, 2013, Notice of Allowance.
U.S. Appl. No. 13/612,840, May 23, 2013, Office Action.
U.S. Appl. No. 13/612,840, Oct. 10, 2013, Office Action.
U.S. Appl. No. 12/780,500, filed May 14, 2010, Alspector.
U.S. Appl. No. 12/780,500, Jan. 9, 2014, Notice of Allowance.
U.S. Appl. No. 13/612,840, Mar. 3, 2014, Notice of Allowance.
U.S. Appl. No. 13/620,913, Apr. 24, 2014, Office Action.

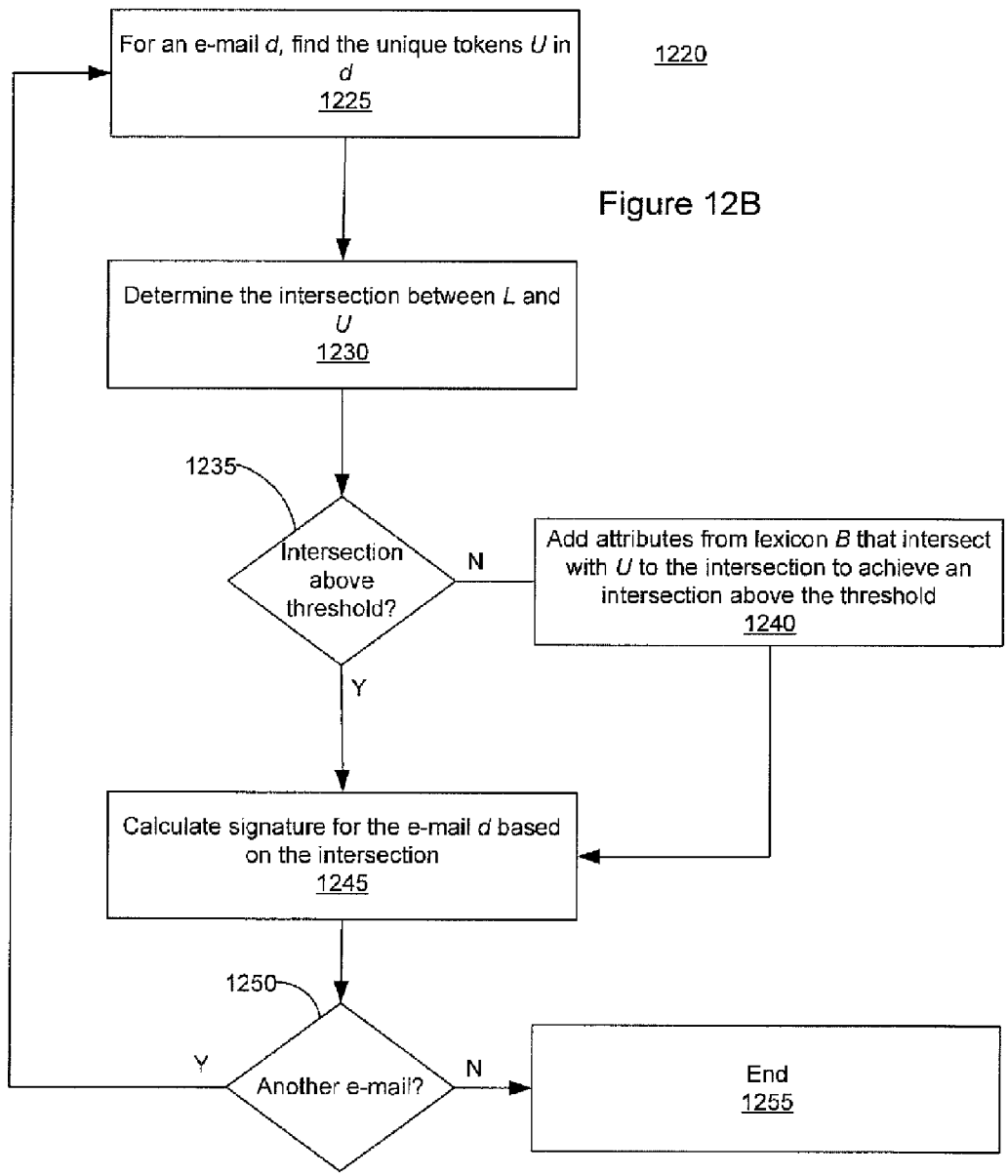

US 9,171,070 B2

METHOD FOR CLASSIFYING UNKNOWN ELECTRONIC DOCUMENTS BASED UPON AT LEAST ONE CLASSIFICATON

CLAIM OF PRIORITY

This is a continuation of U.S. patent application Ser. No. 11/016,930, filed Dec. 21, 2004, and titled "Simplifying Lexicon Creation in Hybrid Duplicate Detection and Inductive Classifier Systems," which claims priority under 35 USC §119(e) to U.S. Provisional Patent Application Ser. No. 60/543,283, filed on Feb. 11, 2004; Ser. No. 60/562,298, filed on Apr. 15, 2004; and Ser. No. 60/580,378, filed on Jun. 18, 2004, all of which are hereby incorporated by reference.

TECHNICAL FIELD

This description relates to duplicate detection and spam filtering.

BACKGROUND

With the advent of the Internet and a decline in computer prices, many people are communicating with one another through computers interconnected by networks. A number of different communication mediums have been developed to facilitate such communications between computer users. One type of prolific communication medium is electronic mail (e-mail).

Unfortunately, because the costs of sending e-mail are relatively low, e-mail recipients are being subjected to mass, unsolicited, commercial e-mailings (colloquially known as e-mail spam or spam e-mails). These are akin to junk mail sent through the postal service. However, because spam e-mail requires neither paper nor postage, the costs incurred by the sender of spam e-mail are quite low when compared to the costs incurred by conventional junk mail senders. Due to this and other factors, e-mail users now receive a significant amount of spam e-mail on a daily basis. Spam e-mail impacts both e-mail users and e-mail providers. For e-mail users, spam e-mail can be disruptive, annoying, and time consuming. For an e-mail service provider, spam e-mail represents tangible costs in terms of storage and bandwidth usage. These costs may be substantial when large numbers of spam e-mails are sent.

SUMMARY

In one aspect, a document is classified using a duplicate detector and an inductive classifier. The inductive classifier receives a training set of documents of known classification and generates attribute information based on the set of training documents of known classification. The inductive classifier also develops a classification model based on the attribute information.

The attribute information is provided to the duplicate detector and the duplicate detector generates a lexicon of attributes based on the attribute information. The duplicate detector also receives a set of documents of known classification and calculates class signatures based on the set of documents of known classification and the lexicon of attributes.

An unknown document is received by the duplicate detector and the duplicate detector generates a query signature based on the unknown document and the lexicon of attributes. The query signature is compared to the class signatures to determine whether the query signature matches a class signature. When the query signature matches a class signature, the duplicate detector indicates that the unknown document has a class of the document corresponding to the class signature that matches the query signature. When the query signature does not match a class signature, the unknown document is provided to the inductive classifier and the inductive classifier applies the classification model to the unknown document to determine a class for the unknown document.

In another aspect, performing duplicate detection includes receiving attribute information from an inductive classifier and generating a lexicon of attributes for use by a duplicate detector in performing duplicate detection based on the attribute information. The attribute information is generated by the inductive classifier during training of the inductive classifier.

Implementations may include one or more of the following features. For example, to generate attribute information based on the set of training documents, the inductive classifier may analyze the set of training documents to determine attributes in the set of training documents and calculate mutual information scores for the attributes in the set of training documents. The inductive classifier may select a portion of the attributes based on the mutual information scores to generate the attribute information.

The duplicate detector may generate the lexicon of attributes by selecting a specified number of the attributes with the highest mutual information scores. The duplicate detector may create attribute clusters from the selected attributes such that the attribute information includes the attribute clusters.

To generate a query signature, the duplicate detector may determine unique attributes in the unknown document and determine an intersection between the unique attributes in the unknown document and the lexicon. The query signature may be calculated based on the intersection.

Generating a lexicon of attributes may include generating a primary lexicon and a secondary lexicon based on the attribute information. When the intersection between the unknown document and the primary document does not exceed the threshold, attributes from the secondary lexicon that intersect with the unique attributes in the unknown document may be added to the intersection to create an augmented intersection that exceeds the threshold. The signature for the document may be calculated based on the augmented intersection.

Generating a primary lexicon may include designating a specified number of the attributes in the set of training documents with the highest mutual information scores as the primary lexicon. At least a portion of the attributes other than the specified number of attributes with the highest mutual information scores may be designated as the secondary lexicon.

The unknown document may include an unknown e-mail. The set of documents of known classification may include a set of spam e-mails and the class signatures may be spam signatures. When the query signature matches a class signature, the duplicate detector may indicate that the unknown document is spam.

Implementations of the described techniques may include hardware, a method or process, or computer software on a computer-accessible medium.

The details of one or more implementations are set forth in the accompanying drawings and the description below. Other features will be apparent from the description and drawings, and from the claims.

DESCRIPTION OF DRAWINGS

FIGS. 12A and 12B are flowcharts showing alternate processes performed by the duplicate detector of FIG. 5 for determining spam signatures and query signatures.

DETAILED DESCRIPTION

Figure 1:
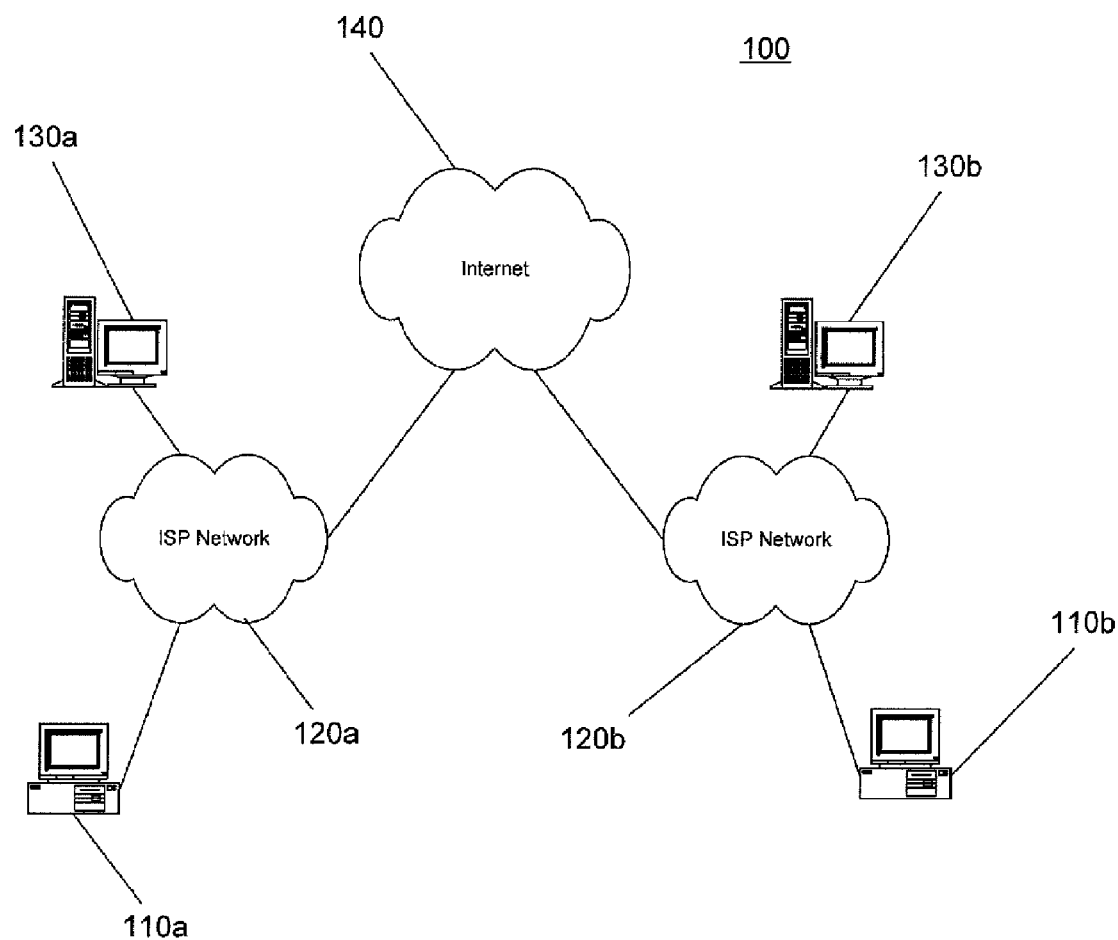
FIG. 1 is a block diagram of an exemplary networked computing environment that supports e-mail communications and in which spam filtering may be performed.

A classification system includes a signature-based duplicate detector and an inductive classifier that share attribute information. The signature-based duplicate detector determines whether two documents are the same by determining if the projections of the two documents onto a lexicon of attributes are the same. To determine whether the projections are the same, the projection of each document is mapped to a signature, and when two documents' signatures match, they are considered to be duplicates.

Accordingly, to determine whether a particular document belongs to a particular class, the duplicate detector initially determines a set of class signatures based on a lexicon of attributes and a set of documents of known class. When a new document is received, the duplicate detector calculates a query signature for the document and compares the query signature to the class signatures to determine if the query signature matches a class signature. If the query signature matches a class signature, then the unknown document is considered a near-duplicate of the corresponding document of known class. If this is the case, then the unknown document is considered to be the same class as the near-duplicate document.

If the query signature does not match a class signature, then the unknown document is passed to the inductive classifier. The inductive classifier uses a classification model to determine one or more class scores for the unknown document, where the class score indicates the likelihood of the document belonging to a particular class. The unknown document is then classified based on the class score.

To perform the duplicate detection and the classification, the duplicate detector and inductive classifier are first initialized by generating a lexicon of attributes for the duplicate detector and a classification model for the classifier. The inductive classifier employs machine learning techniques to develop the classification model that allows the classifier to classify an unknown document. To develop a classification model, a training set of documents of known class are used by the classifier to determine the attributes of the documents that are most useful in classifying an unknown document. The model is developed from these attributes.

Attribute information containing the attributes determined by the classifier is then passed to the duplicate detector. The duplicate detector uses the attribute information to generate the lexicon of attributes, which is used both during initialization to generate the class signatures and during duplicate detection to calculate the query signatures. Using the attribute information from the classifier may eliminate the need of the duplicate detector to separately analyze a set of documents to generate the lexicon.

Such duplicate detection and classification techniques are described below as applied to e-mail spam filtering. However, the techniques may be used for spam filtering in other messaging media, including both text and non-text media. For example, spam may be sent using instant messaging or short message service (SMS), or may appear on Usenet groups. Similarly, the techniques may be applied, for instance, to filter spam sent in the form of images, sounds, or video when an appropriate set of attributes is selected.

Moreover, the techniques described may be applied to other areas of classification in which it is beneficial to determine a class of a document based on detecting near-duplicates of documents of known class and classifying those documents that are not near-duplicates of documents with a known class. For example, news stories may be classified based on word attributes into categories such as sports or technology, while songs may be classified based on sound attributes into categories such as classical or rock.

More generally, the described techniques may be applied to text or non-text items in a variety of document duplication applications. Therefore, the term "document" should be understood to generally refer to a computer file that contains data for use by applications, such as, for example, a file that contains text, images, sounds, video, other media, or a combination thereof. Accordingly, the attributes may be text or non-text attributes as appropriate.

FIG. 1 illustrates an exemplary networked computing environment 100 that supports e-mail communications and in which spam filtering may be performed. Computer users are distributed geographically and communicate using client systems 110a and 110b. Client systems 110a and 110b are connected to ISP networks 120a and 120b, respectively. While illustrated as ISP networks, networks 120a or 120b may be any network, e.g. a corporate network. Clients 110a and 110b may be connected to the respective ISP networks 120a and 120b through various communication channels such as a modem connected to a telephone line (using, for example, serial line internet protocol (SLIP) or point-to-point protocol (PPP)) or a direct network connection (using, for example, transmission control protocol/internet protocol (TCP/IP)). E-mail or other messaging servers 130a and 130b also are connected to ISP networks 120a and 120b, respectively. ISP networks 120a and 120b are connected to a global network 140 (e.g., the Internet) such that a device on one ISP network can communicate with a device on the other ISP network. For simplicity, only two ISP networks 120a and 120b have been illustrated as connected to Internet 140. However, there may be a large number of such ISP networks connected to Internet 140. Likewise, many e-mail servers and many client systems may be connected to each ISP network.

Each of the client systems 110a and 110b and e-mail servers 130a and 130b may be implemented using, for example, a general-purpose computer capable of responding to and executing instructions in a defined manner, a personal computer, a special-purpose computer, a workstation, a server, a device such as a personal digital assistant (PDA), a component, or other equipment or some combination thereof capable of responding to and executing instructions. Client systems 110a and 110b and e-mail servers 130a and 130b may receive instructions from, for example, a software application, a program, a piece of code, a device, a computer, a computer system, or a combination thereof, which independently or collectively direct operations. These instructions may take the form of one or more communications programs that facilitate communications between the users of client systems 110a and 110b. Such communications programs may include, for example, e-mail programs, IM programs, file transfer protocol (FTP) programs, or voice-over-IP (VoIP) programs. The instructions may be embodied permanently or temporarily in any type of machine, component, equipment, storage medium, or propagated signal that is capable of being delivered to a client system 110a and 110b or the e-mail servers 130a and 130b.

Each of client systems 110a and 110b and e-mail servers 130a and 130b includes a communications interface (not shown) used by the communications programs to send communications. The communications may include e-mail, audio data, video data, general binary data, or text data (e.g., data encoded in American Standard Code for Information Interchange (ASCII) format or Unicode).

Examples of ISP networks 120a and 120b include Wide Area Networks (WANs), Local Area Networks (LANs), analog or digital wired and wireless telephone networks (e.g., a Public Switched Telephone Network (PSTN), an Integrated Services Digital Network (ISDN), or a Digital Subscriber Line (xDSL)), or any other wired or wireless network including, e.g., a corporate LAN or WAN. Networks 120a and 120b may include multiple networks or subnetworks, each of which may include, for example, a wired or wireless data pathway.

Each of e-mail servers 130a and 130b may handle e-mail for users connected to ISP network 110a or 110b. Each e-mail server may handle e-mail for a single e-mail domain (e.g., aol.com), for a portion of a domain, or for multiple e-mail domains. While not shown, there may be multiple, interconnected e-mail servers working together to provide e-mail service.

An e-mail user, such as a user of client system 110a or 110b, typically has one or more e-mail mailboxes on an e-mail system, which may incorporate e-mail server 130a or 130b. Each mailbox corresponds to an e-mail address. Each mailbox may have one or more folders in which e-mail is stored. E-mail sent to one of the e-mail user's e-mail addresses is routed to the corresponding e-mail server 130a or 130b and placed in the mailbox that corresponds to the e-mail address to which the e-mail was sent. The e-mail user then uses, for example, an e-mail client program executing on client system 110a or 110b to retrieve the e-mail from e-mail server 130a or 130b and view the e-mail.

The e-mail client programs executing on client systems 110a and 110b also may allow one of the users to send e-mail to an e-mail address. For example, the e-mail client program executing on client system 110a may allow the e-mail user of client system 110a (the sending user) to compose an e-mail message and address the message to a recipient address, such as an e-mail address of the user of client system 110b. When the sender indicates the e-mail is to be sent to the recipient address, the e-mail client program executing on client system 110a communicates with e-mail server 130a to handle the sending of the e-mail to the recipient address. For an e-mail addressed to an e-mail user of client system 110b, for example, e-mail server 130a sends the e-mail to e-mail server 130b. E-mail server 130b receives the e-mail and places it in the mailbox that corresponds to the recipient address. The user of client system 110b may then retrieve the e-mail from e-mail server 130b, as described above.

In an e-mail environment such as that shown, a spammer typically uses an e-mail client or server program to send similar spam e-mails to hundreds, if not millions, of e-mail recipients. For example, a spammer may target hundreds of recipient e-mail addresses serviced by e-mail server 130b on ISP network 120b. The spammer may maintain the list of targeted recipient addresses as a distribution list. The spammer may use the e-mail program to compose a spam e-mail and instruct the e-mail program to use the distribution list to send the spam e-mail to the recipient addresses. The e-mail is then sent to e-mail server 130b for delivery to the recipient addresses. Thus, in addition to receiving legitimate e-mails, e-mail server 130b also may receive large quantities of spam e-mail, particularly when many hundreds of spammers target e-mail addresses serviced by e-mail server 130b.

Thus, e-mail systems tend to be used by any given spammer to send large numbers of substantially similar, although non-identical, e-mails. While the content of each spam e-mail contains essentially the same message, the content of each e-mail is normally varied to a degree. For example, mass e-mailings are often personalized by including the recipient user's first/last name or other personal information. Spammers also may add random text to their e-mails so as to foil some spam detection schemes, such as those based on matching exact textual strings in the e-mail. Usually, the core message of the e-mail remains the same, with random or neutral text added to confuse such "exact-match" spam filters. Often the extra text is inserted in such a way that it is not immediately visible to the users (e.g., when the font has the same color as the background). Other randomization strategies of spammers include: appending random character strings to the subject line of the e-mail, changing the order of paragraphs, or randomizing the non-alphanumeric content.

Furthermore, spammers also may change the words used in the e-mail to convey their message. However, because spam e-mails are typically oriented around the same topics (e.g., pornography), the expressiveness of their content is limited. Thus, even though spammers may attempt to randomize the content of their e-mails, the limitation on the expressiveness of their content results in essentially the same e-mail being sent out, even though the e-mails are not exactly identical.

Consequently, duplicate detection systems that identify nearly identical documents may be useful to filter spam e-mails, either when they enter an e-mail system or later on in the e-mail system (e.g., at the recipient's client system). Identification of spam e-mails at the entry point of an e-mail system may be particularly desirable from the e-mail service provider's perspective, as detection at that point may allow the e-mail service provider to prevent the propagation of such e-mails through the system, thereby reducing the waste of computation and storage resources on unsolicited messages.

In addition, an effective spam filtering system may use a variety of filtering techniques. For instance, an inductive classifier may be employed along-side a duplicate detection system as another component in a spam filtering system. An inductive classifier employs machine learning techniques to develop a classification model that allows the classifier to classify an unknown e-mail or other document as spam or non-spam. Typically, a training set of spam and non-spam e-mails or other documents are used by the classifier to determine the attributes that are most useful in classifying an unknown document and the model is developed from these attributes. The model may then be used to determine a class score for unknown e-mails, where the class score indicates the likelihood of the e-mail belonging to a particular class. Typically, if the class score exceeds a classification threshold, then the unknown e-mail is classified as a member of the particular class (e.g., spam).

Figure 2:
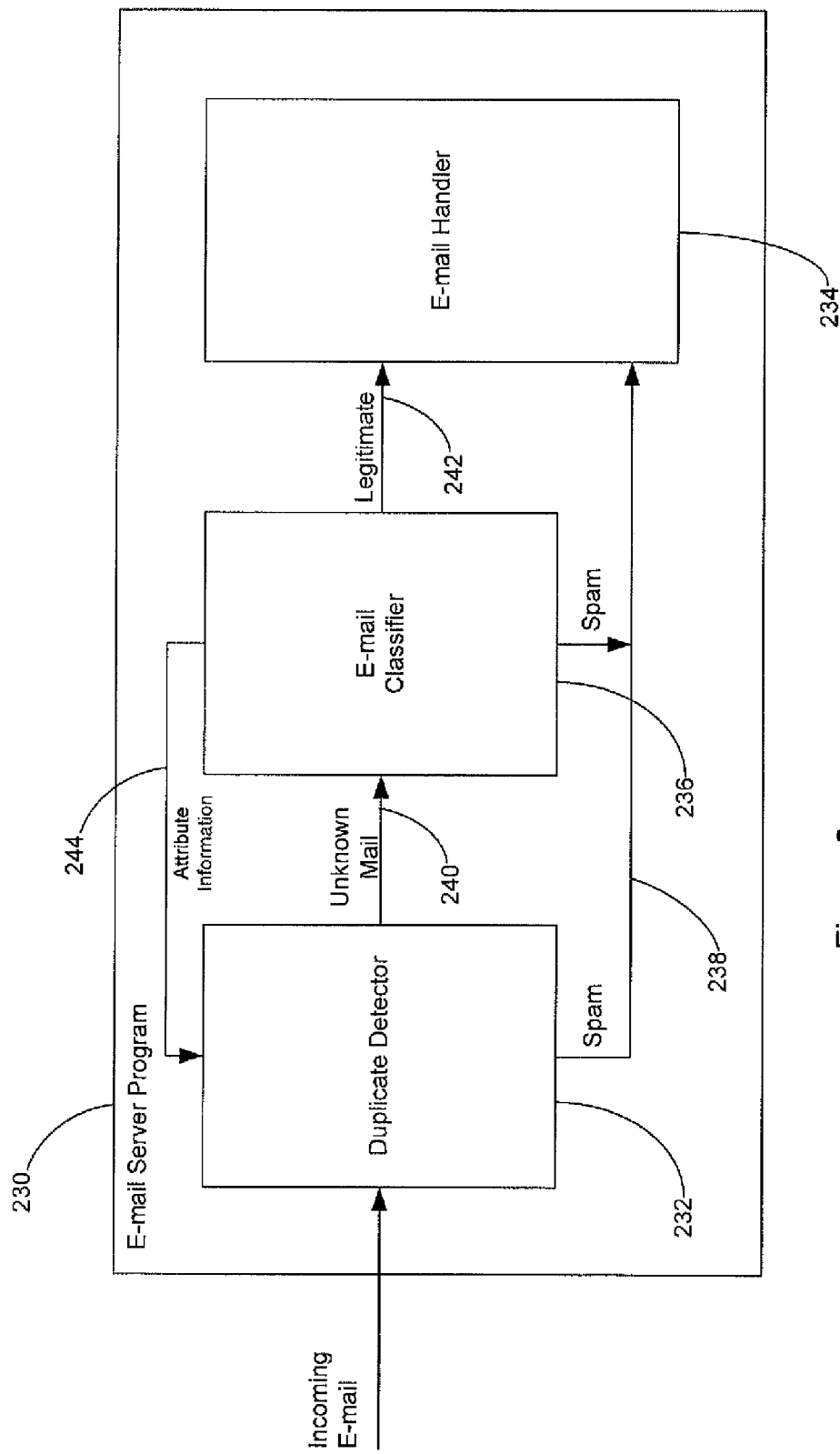
FIG. 2 is a high-level functional block diagram of an e-mail server program that may execute on an e-mail server to provide large-scale spam filtering.

Referring to FIG. 2, to provide spam filtering by duplicate detection and classification, an e-mail server program 230 may execute on an e-mail system (which may incorporate e-mail server 130a or 130b). E-mail server program 230 includes a duplicate detector 232, an inductive classifier 236, and an e-mail handler 234. During operation, the incoming e-mail arriving at e-mail server program 230 is passed to duplicate detector 232. Duplicate detector 232 applies duplicate detection techniques to the e-mail to determine whether the e-mail is a duplicate of a known spam e-mail and, therefore, is a spam e-mail itself. Those e-mails that are spam duplicates 238 are forwarded directly to e-mail handler 234, along with an indication that the e-mail is spam. Those e-mails that are not spam duplicates 240 are forwarded to e-mail classifier 236, which classifies them as spam or legitimate. E-mail classifier 236 then forwards the spam e-mails 236 and legitimate e-mails 242 to e-mail handler 234 along with an indication of whether they are spam or legitimate.

E-mail handler 234 then handles the e-mail in a manner that depends on the policies set by the e-mail service provider. For example, e-mail handler 234 may delete e-mails indicated as spam, while delivering e-mails marked as legitimate to an "inbox" folder of the corresponding e-mail account. Alternatively, e-mail labeled as spam may be delivered to a "spam" folder instead of being deleted.

Figure 3:
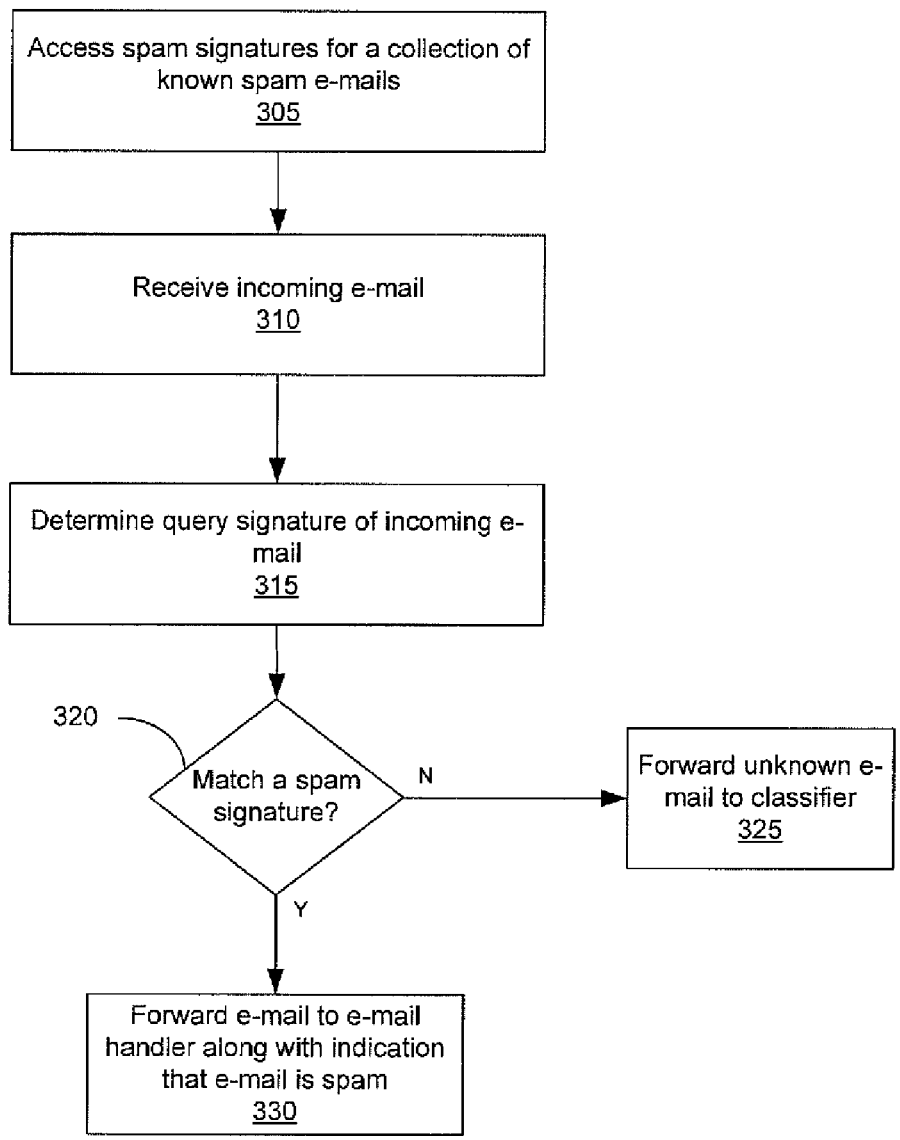
FIG. 3 is a flowchart of a process that may be employed by a duplicate detector to apply a signature-based duplicate detection technique to identify spam e-mails.

Referring to FIG. 3, a process 300 may be employed by duplicate detector 232 to apply a signature-based duplicate detection technique to identify spam e-mails. In signature, or fingerprint, based duplicate detection systems, two documents are considered to be the same if their projections onto a lexicon of attributes are the same (where the attributes are typically those that have characteristics particularly suited to identifying a given document). To determine whether the projections are the same, the projection of each document is normally mapped to a signature, and when two documents' signatures match, they are considered to be duplicates.

For example, in the I-Match approach described by Chowdhury et al. in "Collection Statistics For Fast Duplicate Document Detection," *ACM Transactions on Information Systems,* 20(2):171-191, 2002 [hereinafter Chowdhury], two documents are considered to be the same if the projection of the unique words in the documents onto a lexicon of words is the same. To that end, a lexicon of words is developed, where the words chosen are those that have characteristics that are most useful in specifically identifying a given document. More particularly, in I-Match, the lexicon is developed by examining a collection of documents and selecting the words in the collection that have a mid-range inverse document frequency (idf) or mid-range normalized inverse document frequency (nidf).

For a given document, the set of unique words (i.e., each different word) in the document is identified. For example, if the word "cabin" is used in a document multiple times, it is listed once in the set of unique words. The intersection between the set of unique words and the lexicon is obtained (i.e., the words that are in both the lexicon and the set of unique words are identified). This intersection is then mapped to a single hash value using a hash algorithm such as the Secure Hash Algorithm 1 (SHA1) developed by the National Institute of Standards and Technology (described in Chowdhury and in RFC 3174, available at http://www.faqs.org/rfcs/rfc3174.html). If the hash value matches the hash value of another document, then the two documents are considered to be duplicates of one another.

Using such techniques, after a collection of known spam e-mails has been obtained, the signatures of the known spam e-mails may be calculated to obtain spam signatures, which are then used to determine if new e-mails are duplicates of the known spam e-mails, and hence, are spam e-mails themselves.

Accordingly, in process 300, duplicate detector 232 accesses spam signatures for a collection of known spam e-mails (305). When the duplicate detector 232 subsequently receives an incoming e-mail (310), duplicate detector 232 applies the duplicate detection techniques to the incoming e-mail to obtain a signature of the e-mail (a "query signature") (315). Duplicate detector 232 then compares the query signature to the spam signatures to determine if the query signature matches one of the spam signatures (320). If the query signature does not match a spam signature (320), then duplicate detector 232 forwards the incoming e-mail to e-mail classifier 236. On the other hand, if the query signature does match a spam signature (320), then the incoming e-mail is forwarded to the e-mail handler 234 with an indication that the e-mail is spam. E-mail handler 234 then handles the incoming e-mail accordingly.

Figure 4:
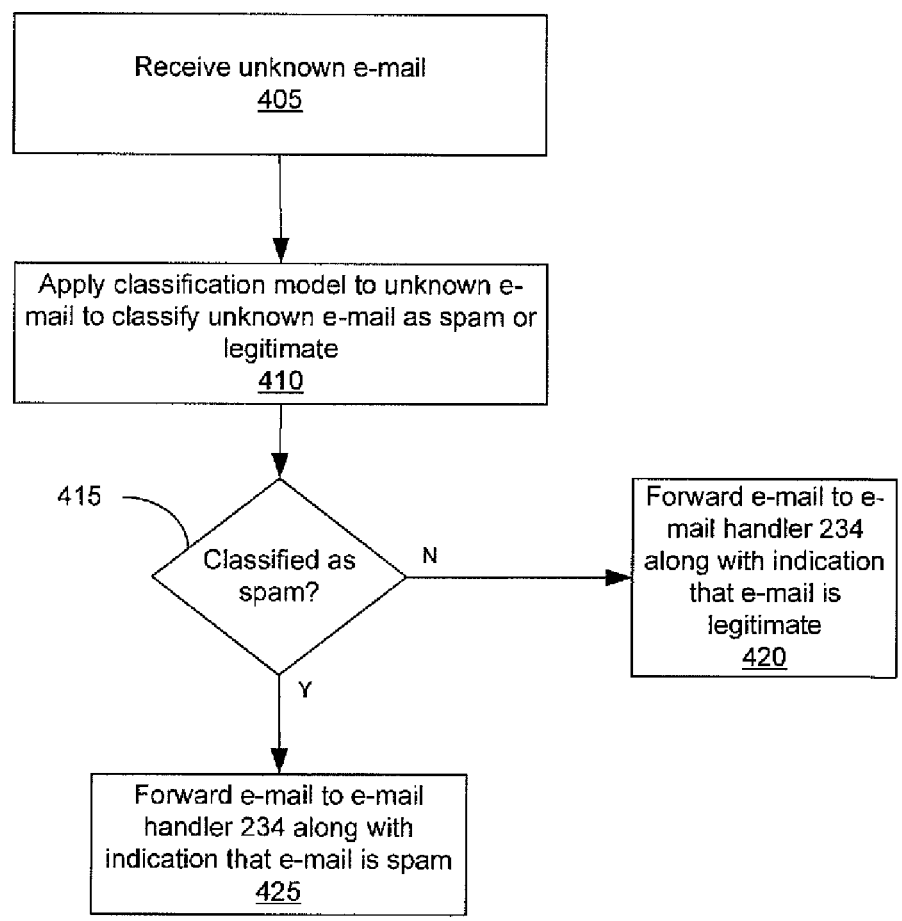
FIG. 4 is a flowchart of a process that may be employed by an e-mail classifier to classify e-mails as spam or legitimate.

Referring to FIG. 4, a process 400 may be employed by classifier 236 to classify an unknown e-mail received from duplicate detector 232 as spam or legitimate. As described, an inductive classifier uses a training set of e-mails to develop a classification model. To do so, the training set of e-mails are analyzed to determine the attributes of the e-mails in the training set. Attribute selection techniques are then applied to determine the attributes that discriminate the best between the classes (e.g., that help to distinguish spam e-mails from legitimate). The Mutual Information (MI) criterion, for example, is one such technique used to determine how well particular attributes discriminate between the classes. Generally, this criterion scores the attributes, where the scores provide a measure of how well an attribute discriminates between classes. The top N attributes are then selected (where N is chosen by the system designer and is typically system dependent) and used to develop a classification model, which is then applied to unknown e-mails to determine the class of the e-mail.

Accordingly, in process 400, when an unknown e-mail is received from duplicate detector 232 (405), the classification model is applied to the unknown e-mail to classify the unknown e-mail as spam or legitimate (410). To do so, the model may be used to determine a spam score for the unknown e-mail, where the spam score indicates the likelihood that the e-mail is spam. If the spam score exceeds a classification threshold, then the unknown e-mail is classified as spam, otherwise it is classified as legitimate. If the unknown e-mail is classified as spam, then e-mail classifier 236 forwards the unknown e-mail to e-mail handler 234 with an indication that the e-mail is spam. On the other hand, if the unknown e-mail is classified as legitimate, then the unknown e-mail is forwarded to the e-mail handler 234 with an indication that the e-mail is legitimate. E-mail handler 234 then handles the incoming e-mail accordingly.

Figure 5:
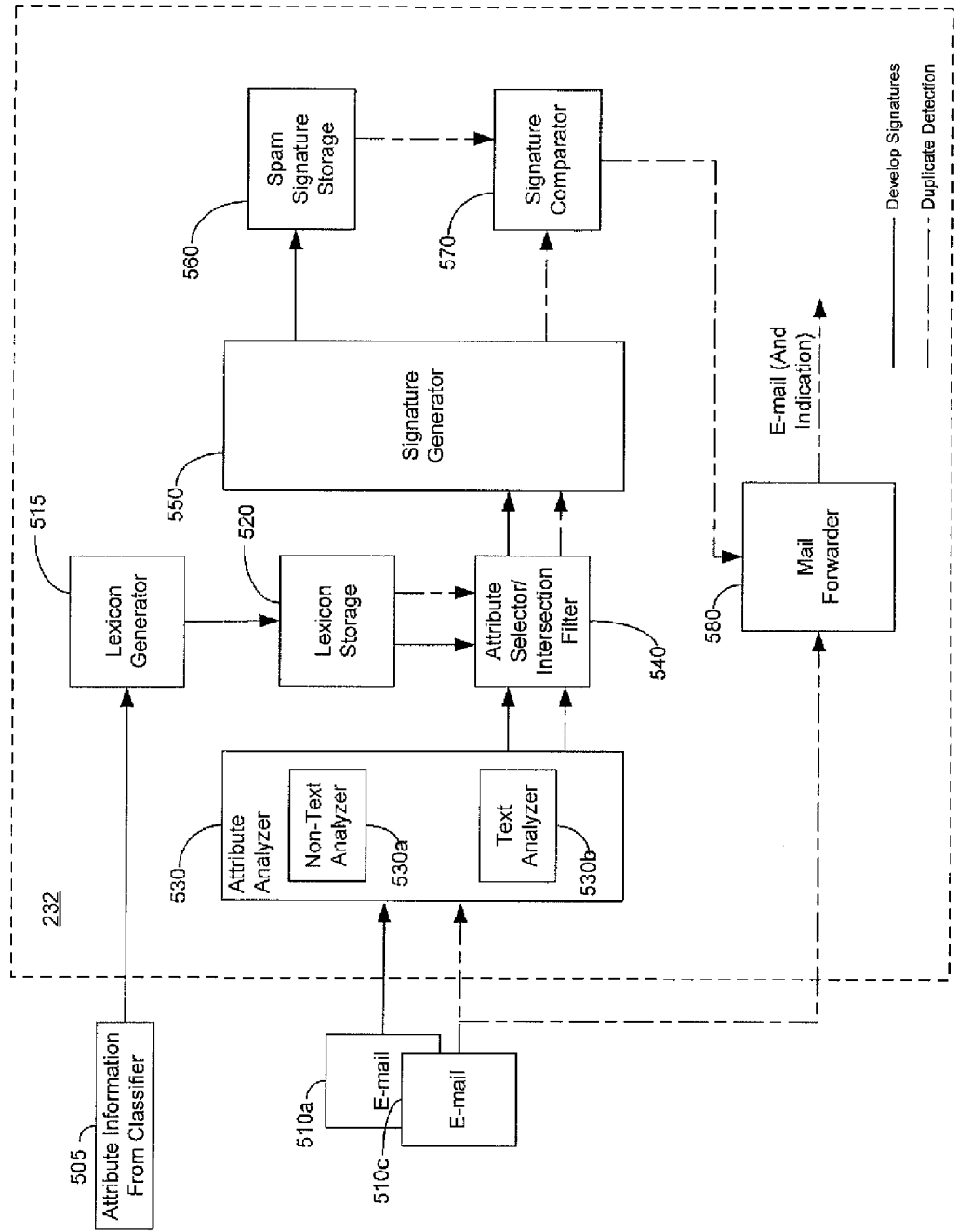
FIG. 5 is a block diagram of an implementation of the duplicate detector shown in FIG. 2.
Figure 6:
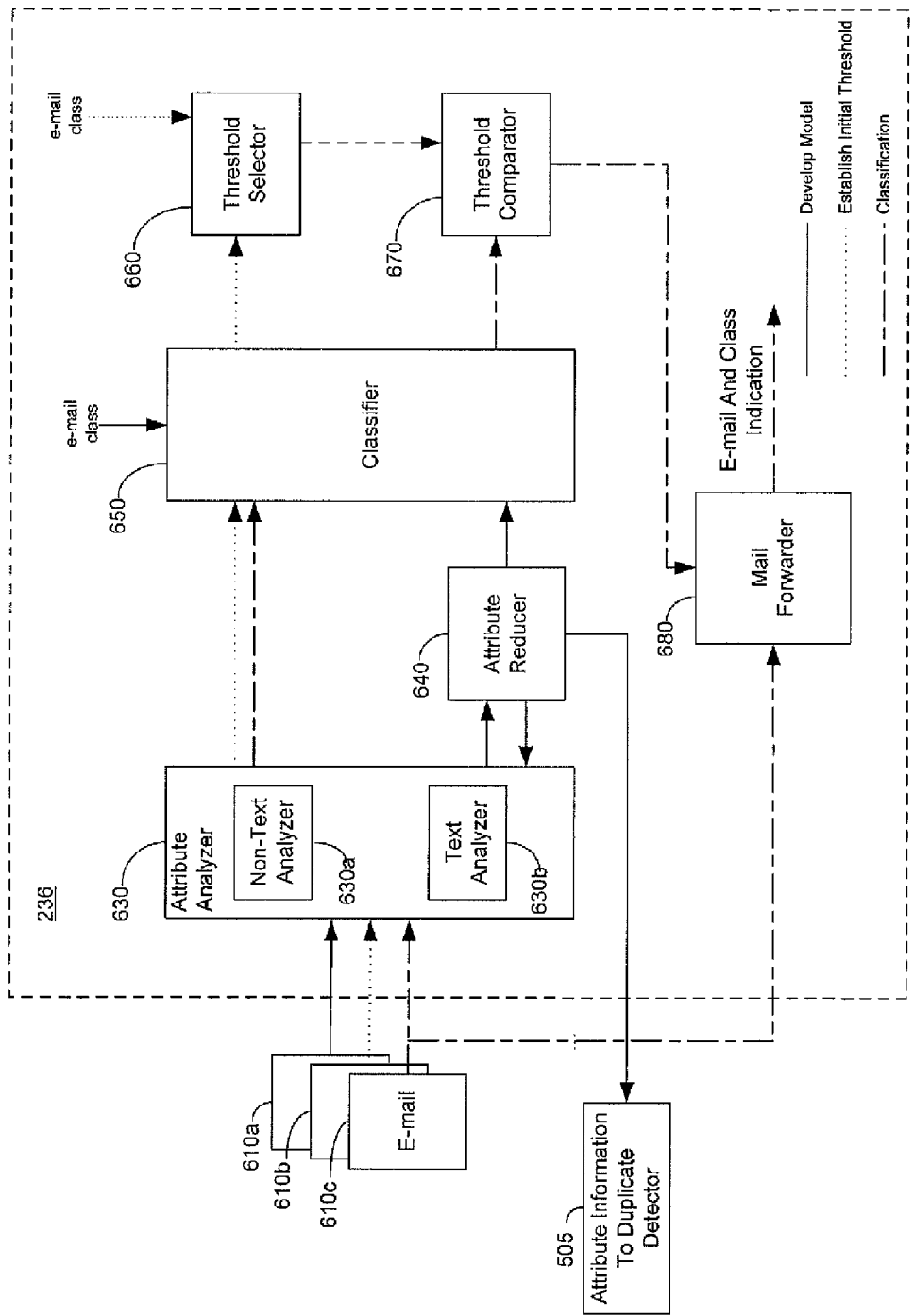
FIG. 6 is a block diagram of an implementation of the inductive e-mail classifier shown in FIG. 2.
Figure 10:
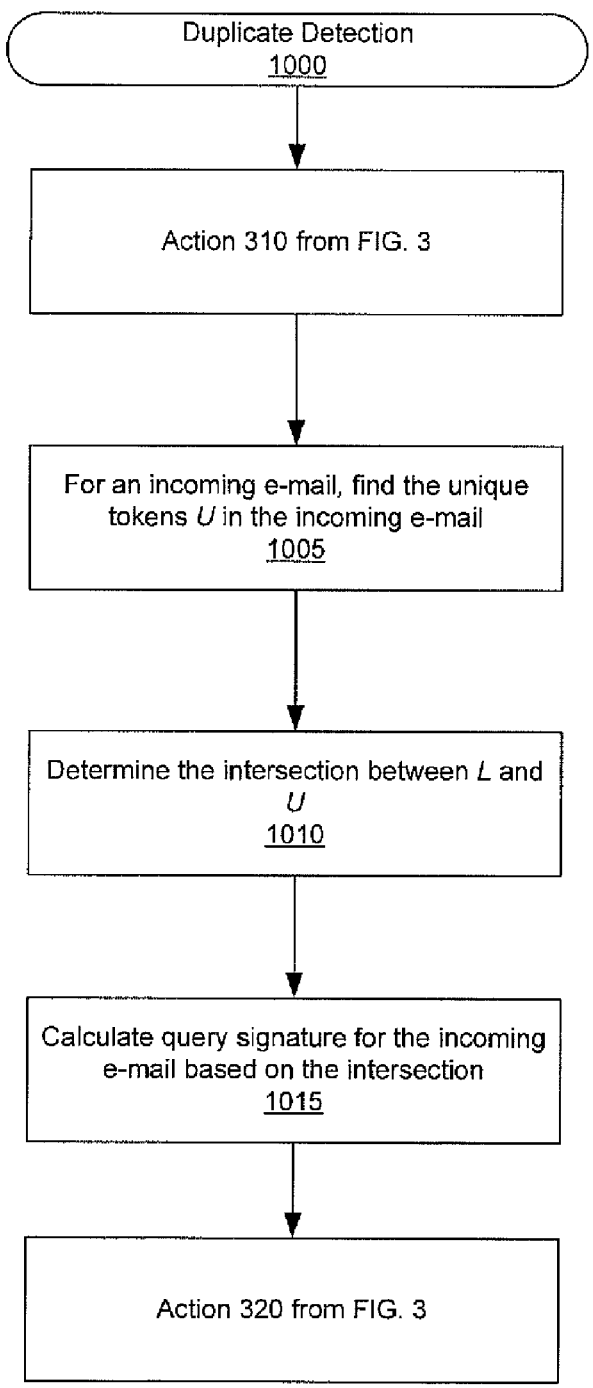
Figure 11:
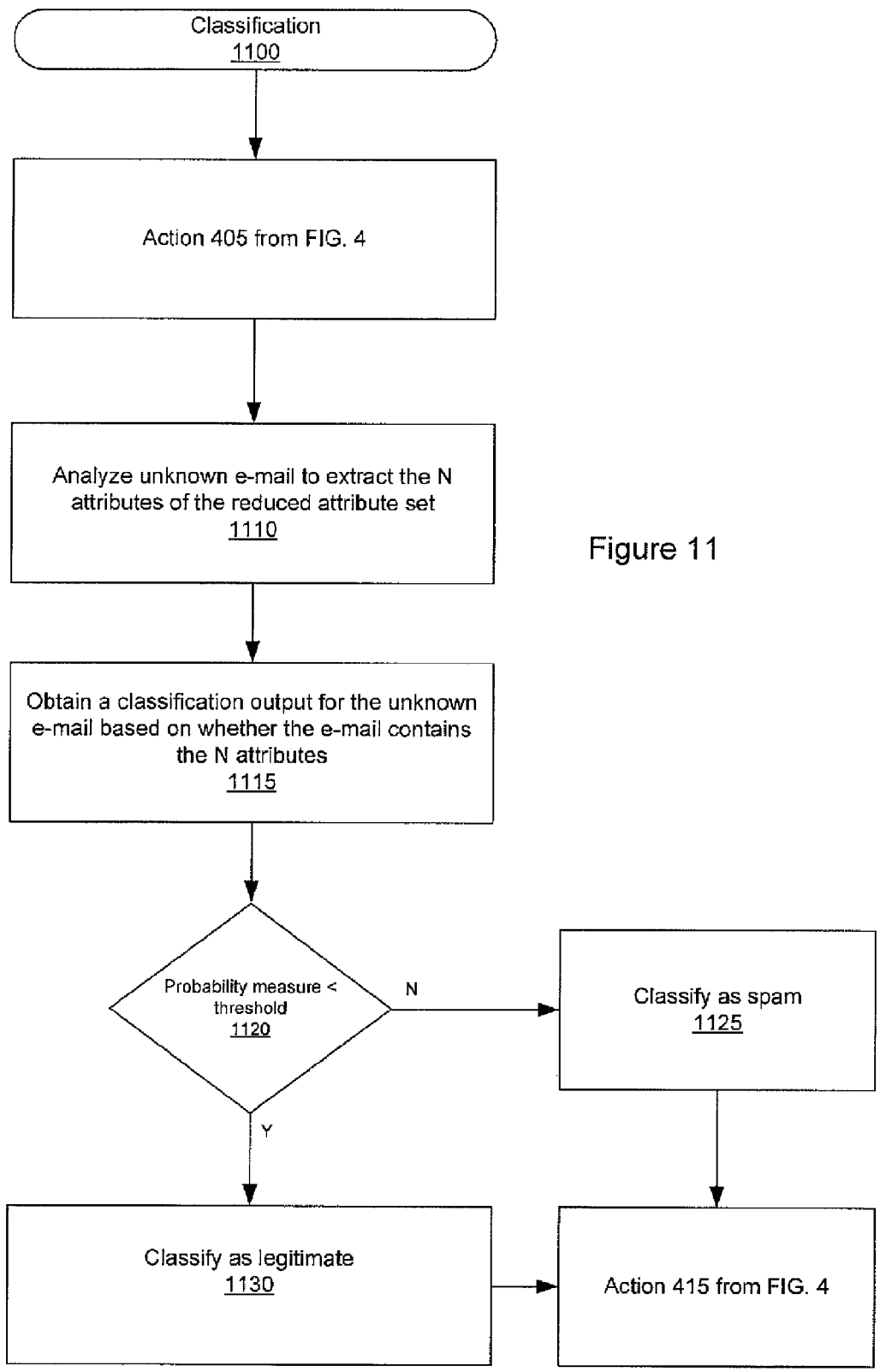

Thus, inductive classifiers and some signature-based duplicate detection techniques employ some form of attribute selection. In the case of inductive classifiers, attribute selection is used to determine the attributes that best discriminate between the classes. In some duplicate detection systems, attribute selection is performed to obtain a lexicon of attributes that are the most useful at identifying a particular document. Attribute selection techniques used in inductive classifiers, such as the MI criterion, tend to select attributes that are both fairly frequent and, at the same time, are effective for discriminating between the classes. Similarly, some techniques used to build lexicons in signature-based duplicate detection systems, such as selecting attributes according to their idf or nidf, tend to select attributes that are fairly frequent. As such, in a hybrid spam filtering system that uses both an inductive classifier and a signature-based duplicate detector that employs a lexicon, the attributes selected during training of the inductive classifier may be used to generate the lexicon used in the duplicate detector. Accordingly, referring again to FIG. 2, attribute information 244 may be shared between classifier 236 and duplicate detector 232 in e-mail server program 230 so that a lexicon of attributes can be generated by duplicate detector 232 from the attributes selected by the e-mail classifier 236 during training. Using the attributes selected during training of e-mail classifier 236 to generate the lexicon used by duplicate detector 232 eliminates the need for duplicate detector 232 to analyze a collection of documents to build a lexicon, thereby simplifying the process of initializing duplicate detector 232 and e-mail classifier 236 for duplicate detection and classification FIGS. 5 and 6 show exemplary implementations of duplicate detector 232 and classifier 236 in which attribute information is shared. FIGS. 7A-11 show exemplary processes for operating duplicate detector 232 and classifier 236. Particularly, FIGS. 7A-9 show processes performed to initialize duplicate detector 232 and e-mail classifier 236, while FIGS. 10 and 11 show particular implementations of actions 315 (FIG. 3) and 410 (FIG. 4), respectively, performed by duplicate detector 232 and e-mail, classifier 236 to perform duplicate detection and classification of incoming e-mails.

Referring to FIG. 5, duplicate detector 232 includes a lexicon generator 515, a lexicon storage 520, an attribute analyzer 530, an attribute selector/intersection filter 540, a signature generator 550, a spam signature storage 560, a signature comparator 570, and a mail forwarder 580. The various components of duplicate detector 232 generally function and cooperate during two phases: spam signature development and duplicate detection. To simplify an understanding of the operation of duplicate detector 232 during each phase, the data flow between the various components is shown separately for each phase. A non-broken line is shown for data flow during spam signature development and a broken line with alternating long and short dashed lines indicates the data flow during duplicate detection.

Referring to FIG. 6, e-mail classifier 236 includes an attribute analyzer 630, an attribute reducer 640, a classifier 650, a threshold selector 660, a threshold comparator 670, and a mail forwarder 680. The various components of e-mail classifier 236 generally function and cooperate during three phases: training, optimization, and classification. To simplify an understanding of the operation of e-mail classifier 236 during each phase, the data flow between the various e-mail classifier 236 components is shown separately for each phase. A non-broken line is shown for data flow during the training phase, a line broken at regular intervals (i.e., dotted) indicates data flow during the optimization phase, and a broken line with alternating long and short dashed lines indicates the data flow during classification.

Figure 7A:
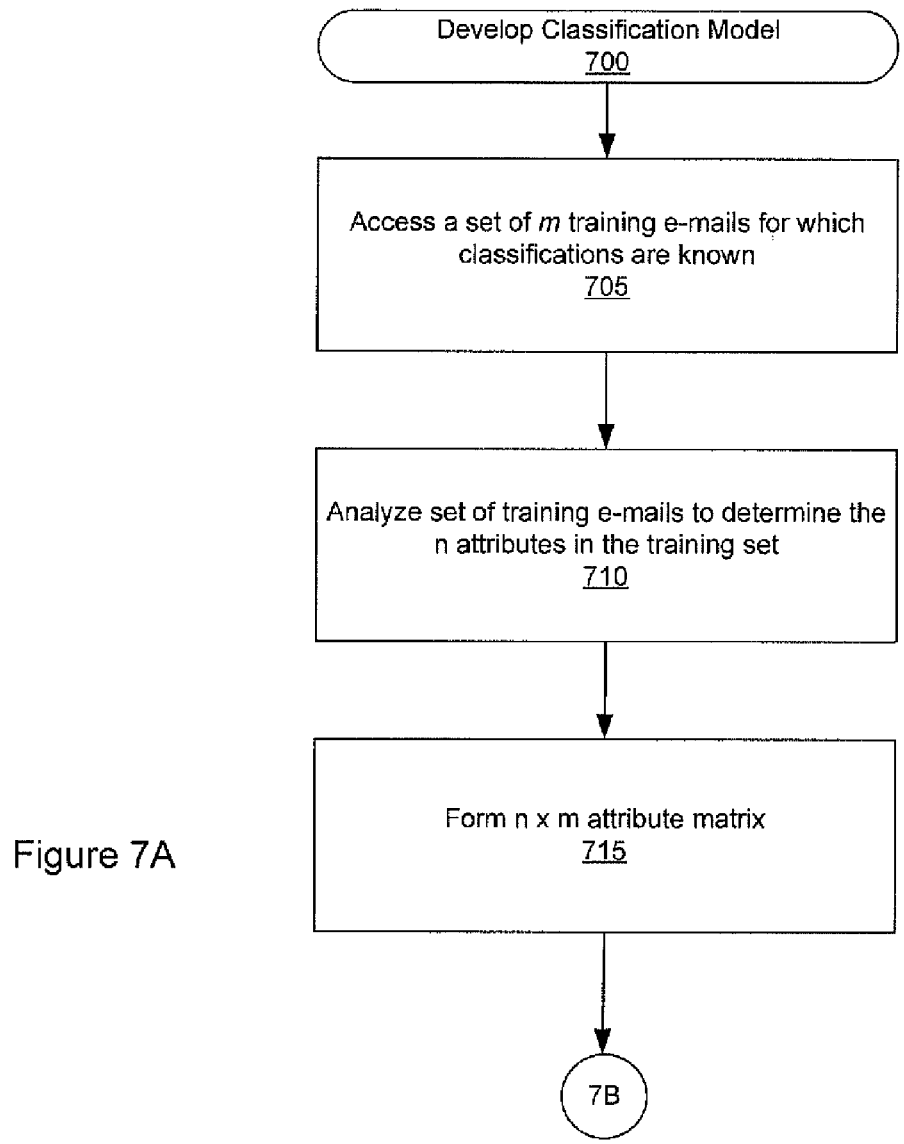
FIGS. 7A-11 show exemplary processes for operating the duplicate detector of FIG. 5 and the e-mail classifier of FIG. 6 in which attribute information is shared.
Figure 7B:
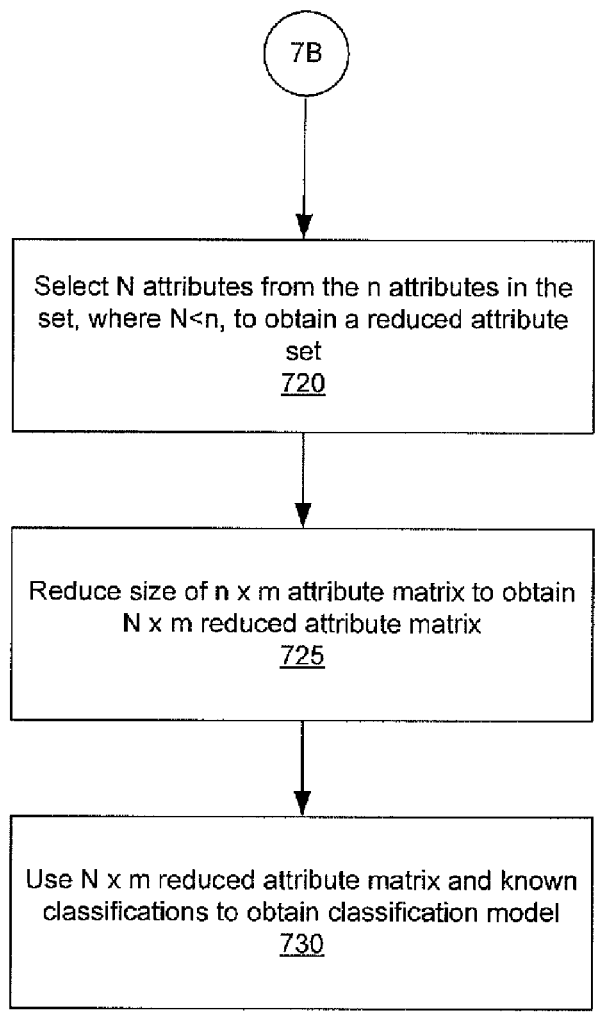

Referring to FIGS. 6 and 7A, in general, during the training phase of the e-mail classifier 236 (i.e., when a classification model is developed) (700), a set of m e-mails (the "training e-mails") having a known classification (e.g., known as spam or legitimate) are accessed (705) and used to train e-mail classifier 236. The set of m training e-mails may contain only unique e-mails (i.e., duplicate or near-duplicate e-mails may be removed from a set of spam e-mails to form the training set). To train e-mail classifier 236, the m training e-mails are analyzed to obtain the n attributes of the set of training e-mails (710) and to form an n-by-m attribute matrix (715). Referring to FIGS. 6 and 7B, attribute selection is performed to select N attributes of the n attribute set, where N<n (720), and the n-by-m attribute matrix is reduced accordingly to an N-by-m reduced attribute matrix (725). The N-by-m reduced attribute matrix is used along with the known classification of the training e-mails to obtain an internal classification model (730).

More particularly, and with reference to the unbroken reference flowpath of FIG. 6, a set of m training e-mails 610a is input into e-mail classifier 236 and applied to attribute analyzer 630 (710). During training, attribute analyzer 630 analyzes the set of m training e-mails to determine n attributes of the set of m training e-mails (the "attribute set"). The attribute set may be composed of text and non-text attributes. Text attributes generally include the text in the bodies and subject lines of the e-mails. Non-text attributes may include various other attributes of the e-mails, such as formatting attributes (e.g., all caps), address attributes (e.g., multiple addressees or from a specific e-mail address), or other attributes of an e-mail message such as whether there is an attachment or the e-mail contains image, audio, or video features.

Attribute analyzer 630 includes a text analyzer 630b and a non-text analyzer 630a. During training, text analyzer 630b identifies text attributes of each e-mail message in the set of m training e-mails. The attributes may be, e.g., words or sets of words that form phrases, where a word may be defined as a set of alphanumeric characters delimited by whitespace or punctuation. Additionally, the attributes may be tokenized. Accordingly, text analyzer 630b may parse each training e-mail to determine the text attributes and tokenize the determined text attributes. Text analyzer 630b keeps track of tokens and the e-mails within which they occur.

Non-text analyzer 630a determines whether each non-text attribute is present in each training e-mail. The exact non-text attributes for which each training e-mail is analyzed typically is a matter of design and empirical judgment, and may be domain specific. For each non-text attribute, a binary value is generated, indicating whether the attribute is present or not.

Attribute analyzer 630 creates a sparse n-by-m attribute matrix (where n is the total number of text and non-text attributes) from the results of text analyzer 630b and non-text analyzer 630a (715). Each entry in the matrix is a binary value that indicates whether the $n^{th}$ attribute is present in the $m^{th}$ e-mail.

The n-by-m attribute matrix is provided to attribute reducer 640, which reduces the n-by-m attribute matrix to a sparse N-by-m reduced attribute matrix (where N is less than n), using, for example, the MI criterion (720 and 725). In other words, attribute reducer 640 selects a reduced set of the n attributes (the "reduced attribute set") and reduces the size of the attribute matrix accordingly. To do so, attribute reducer 640 calculates the mutual information score for each of the n attributes, ranks the scored attributes, and selects the top N attributes as the reduced attribute set (where N is selected by the system designer). The optimal choice of N may depend on the particular system and may be determined through trial and error. Attribute reducer 640 also transmits attribute information 505 including the attributes and their respective mutual information scores to duplicate detector 232, which uses the attribute information 505 as described with respect to FIG. 8. The attribute information provided to duplicate detector 232 may include only the textual attributes and their scores, only the non-textual attributes and their scores, or both the textual and non-textual attributes and their scores or some subset of any of these combinations.

Techniques other than the MI criterion may be used, alternatively or additionally, to implement such attribute selection. For example, document frequency thresholding, term strength, or $\chi^2$ may be suitable techniques.

The N selected attributes are communicated to attribute analyzer 630, which analyzes the incoming e-mails during the optimization phase and the classification phase for the N selected attributes instead of all of the attributes in the incoming e-mails.

The N-by-m reduced attribute matrix is input into classifier 650 to develop a classification model (730). Each row of the N-by-m reduced attribute matrix corresponds to one of the m training e-mails and contains data indicating which of the N selected attributes are present in the corresponding training e-mail. Each row of the reduced attribute matrix is applied to classifier 650. As each row is applied to classifier 650, the known classification of the training e-mail to which the row corresponds also is input.

In response to the N-by-m reduced attribute matrix and corresponding classifications, classifier 650 builds an internal classification model that is used to evaluate future e-mails with unknown classification (i.e., non-training e-mails) (730). Classifier 650 may be implemented using known probabilistic or other classification techniques. For example, classifier 650 may be a support vector machine (SVM), a Naïve Bayesian classifier, or a limited dependence Bayesian classifier. Classifier 650 also may be implemented using known techniques that account for misclassification costs when constructing the internal model. For example, A. Kolcz and J. Alspector, *SVM-based Filtering of E-mail Spam with Content-specific Misclassification Costs*, ICDM-2001 Workshop on Text Mining (TextDM-2001), November 2001 provides a discussion of some techniques for training a classifier in a manner that accounts for misclassification costs.

Figure 8:
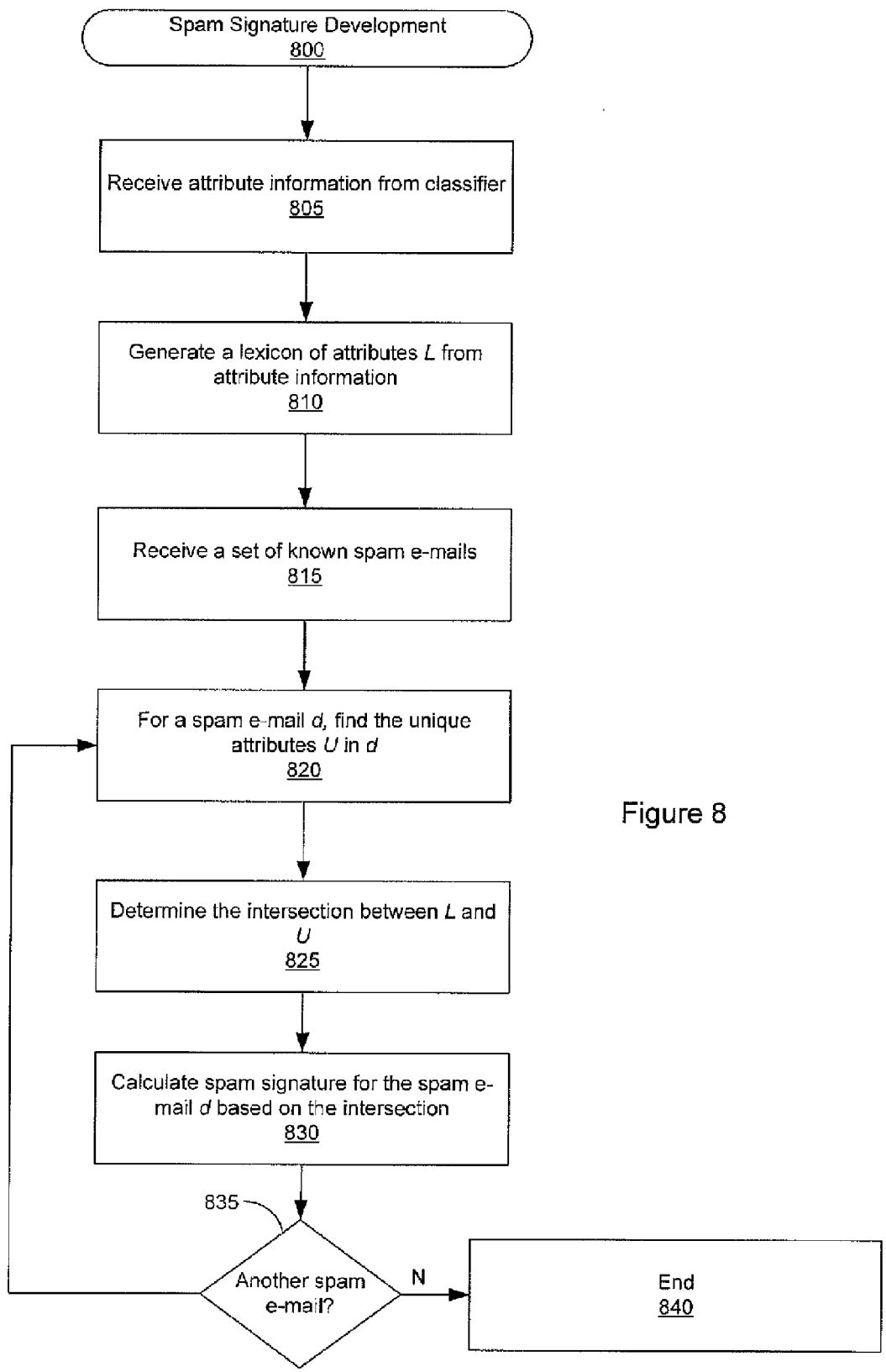

Referring to FIGS. 5 and 8, duplicate detector 232 uses the attribute information 505 received from attribute reducer 640 during a spam signature development phase 800 to develop a lexicon, which is used with a set of known spam e-mails to generate spam signatures. In general, during the spam signature development phase, the attribute information 505 is received from attribute reducer 640 (805). A lexicon of attributes L is generated from the attribute information 505. In addition, a set of known spam e-mails is received (815). For a spam e-mail d from the set, the unique attributes U in the spam e-mail d are determined (820). The intersection between the unique attributes U and the lexicon L is then determined (i.e., the unique attributes U that are also in the lexicon L are determined) (825). The spam signature for the spam e-mail d is then calculated based on the intersection (830) and stored. This process is continued for each spam e-mail (835) until the spam signatures for the e-mails in the set of known spam e-mails are calculated and stored (840).

More particularly, and with reference to the unbroken reference flowpath of FIG. 5, the attribute information 505 is received by the lexicon generator 515 (805). The lexicon generator then generates the lexicon of attributes L (810) and stores the lexicon in lexicon storage 520. To generate the lexicon L from the attribute information 505, the attributes are ranked according to their mutual information scores (if not done so already) and the attributes with the top M scores are selected for the lexicon L (where M is selected by the system designer). The optimal choice of M may depend on the particular system and may be determined through trial and error. The choice of M may be the same or different from the choice of N. If M is the same as N, then attribute reducer 640 may send only the N attributes to duplicate detector 232, with the N attributes then being used as the lexicon L.

The attributes in lexicon L may include both text and non-text attributes. Alternatively, only text attributes or only non-text attributes may be used. If attribute reducer 640 transmits both text and non-text attributes in the attribute information 505, and only one or the other is used by duplicate detector 232, then lexicon generator 515 may ignore the unused attributes. If only text or non-text attributes are used, attribute reducer 640 may send only the one used in the attribute information 505.

A set of known spam 510*a* are received by duplicate detector 232 (815) and applied to an attribute analyzer 530. For a given e-mail d in the set of known spam e-mails, attribute analyzer 530 determines the unique attributes U in e-mail d (820). Attribute analyzer 530 may employ a non-text analyzer 530*a* to determine non-text attributes (if used by duplicate detector 232) and a text analyzer 530*b* to determine text attributes (if used by duplicate detector 232).

To determine the unique attributes U, text analyzer 530*a* may, for example, parse the body and subject line of the e-mail d to tokenize the contents of the body and retain a given token if that token has not been encountered before in the body of e-mail d. The tokenization scheme used by text analyzer 530*a* may be the same as the tokenization scheme used by text analyzer 630*a* so as to assure that the tokens for the unique attributes have the same form as the tokens for the attributes in lexicon L. In some implementations, text analyzer 530*a* may only retain attributes that meet a certain criteria (e.g., is at least four characters long or has only one digit) and may apply a common formatting to the attributes (e.g., change all letters to lower case). Similarly, if non-text attributes are used, non-text analyzer 530*b* may parse e-mail d to determine which non-text attributes are included in e-mail d.

Next, attribute analyzer 530 passes the unique attributes U to attribute selector/intersection filter 540. Attribute selector 540 determines the intersection between unique attributes U and the primary lexicon L (825). To do so, attribute selector 540 accesses the lexicon L from lexicon storage 520. Attribute selector then filters the unique attributes U against the lexicon L to determine the unique attributes U that are also in lexicon L. The unique attributes U that are also in L form the intersection between U and L.

Attribute selector 540 then passes the intersection to signature generator 550. Signature generator 550 calculates the signature for e-mail d based on the intersection (830). To do so, a hash algorithm that maps the set of intersection tokens to a single hash value may be used, where the single hash value is the signature for the e-mail d. For example, the SHA1 algorithm as described and implemented in Chowdhury may be used. The hash value is then stored as a spam signature in spam signature storage (560).

If there is another spam e-mail in the set of known spam e-mails (835), then the spam signature for that e-mail is also calculated as described above (835). Otherwise, the spam signature development phase ends (840).

Figure 9:
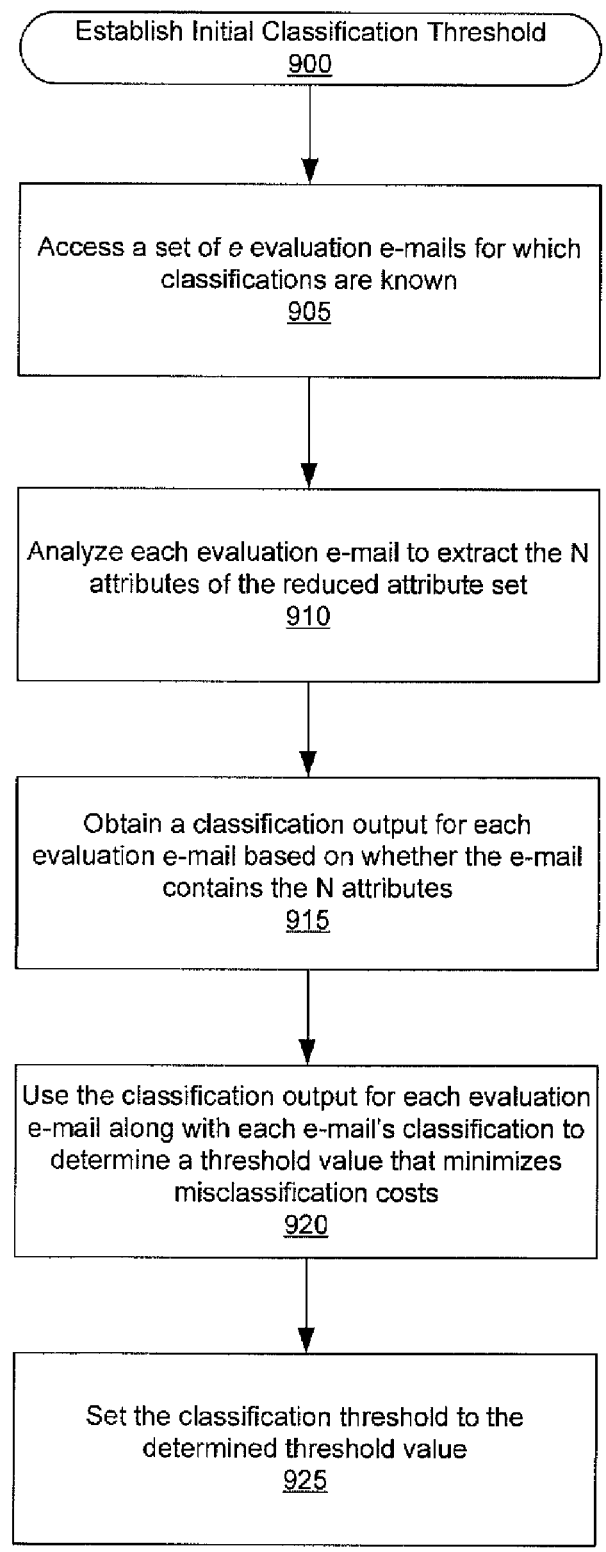

Referring to FIGS. 6 and 9, in parallel with the spam signature development phase of duplicate detector 232 (or before or after), e-mail classifier 236 performs an optimization phase 900 to establish an initial classification threshold. In general, during the optimization phase 900 a set of e e-mails (the "evaluation e-mails") having a known classification (e.g., are known to either be spam or legitimate) is accessed (905) and used to set the initial classification threshold of e-mail classifier 236. The set of e evaluation e-mails may contain only unique e-mails (i.e., duplicate or near-duplicate e-mails may be removed from a set of known spam e-mails to form the evaluation set).

To set the initial classification threshold, each e-mail in the set of e evaluation e-mails is analyzed to determine whether or not it contains the N attributes of the reduced attribute set (910). This data is used to obtain a spam score for the e-mail and a classification output is produced from the spam score (915). The classification output for each e-mail in the reduced set of evaluation e-mails is used along with the known classification of each e-mail in the set to obtain an initial threshold value that minimizes the misclassification costs (920). The classification threshold then is set to this value (925).

In particular, and with reference to the dotted line of FIG. 6, during the initial threshold setting phase, the set of e evaluation e-mails 610b is input into classifier 232 and applied to attribute analyzer 630. For each e-mail, attribute analyzer 630 determines whether or not the e-mail has the N attributes of the reduced attribute set (determined at 720 in FIG. 7B) and constructs an N element attribute vector (910). Each entry in the N element attribute vector is a binary value that indicates whether the $N^{th}$ attribute is present in the e-mail.

The N element attribute vector for each evaluation e-mail is input into classifier 650, which applies the internal model to the attribute vector to obtain a spam score that indicates the likelihood that the corresponding e-mail is spam. A classification output is produced from this spam score (915). The classification output, for example, may be the spam score itself or a linear or non-linear scaled version of the spam score. The classification output is input to threshold selector 660, along with the corresponding known classification of the e-mail.

Once a classification output for each e-mail in the reduced set of evaluation e-mails has been obtained and input to threshold selector 660, along with the corresponding classification, threshold selector 660 determines the initial threshold (920). Conceptually, threshold selector constructs a Receiver Operating Characteristic (ROC) curve from the classification output and classifications and chooses an operating point on the ROC curve that minimizes misclassification costs.

The misclassification costs of a given classifier F with respect to a set of unique e-mails can be expressed in one exemplary representation as:

$$L_u = \pi \cdot FP + (1-\pi) \cdot cost \cdot FN$$

where the false-positive rate (FP) is:

$$FP = \frac{\sum_{x \in l_u}[F(x) = l]}{|s_u|}$$

and the false-negative rate (FN) is:

$$FN = \frac{\sum_{x \in s_u}[F(x) = s]}{|l_u|}$$

and where $\pi = s_u/E_u$, E is an evaluation set of e-mail, $E_u$ is the set of unique e-mails in set E, $s_u$ is the spam e-mail subset of $E_u$, and $l_u$ is the legitimate e-mail subset of $E_u$. [F(x)=s] is equal to one when the classifier returns spam as the class, zero otherwise. [F(x)=l] is equal to one when the classifier classifies an e-mail as legitimate, zero otherwise. The cost of misclassifying a spam e-mail as legitimate is assumed to be one, while cost represents the assigned cost of misclassifying legitimate e-mail as spam e-mail. The exact value of this parameter is chosen as a matter of design. For example, a value of 1000 may be chosen. As described further below, some implementations may use values of cost that depend on a legitimate e-mail's subcategory.

The relationship between FP and FN for a given classifier is known as the Receiver Operating Characteristic. Different choices of the classification threshold for a classifier result in different points along the classifier's ROC curve. Threshold selector 660 uses the classification outputs and known classifications to determine the threshold value that sets the operation of classifier 236 at a point on the classifier's ROC curve that minimizes $L_u$, i.e. the misclassification costs. For example, threshold selector 660 may evaluate $L_u$ for a number of different threshold values and choose the one that minimizes $L_u$.

Once threshold selector 660 determines the initial threshold value that minimizes the misclassification costs, the threshold value is input to threshold comparator 670 and used as an initial classification threshold (925). Threshold comparator 670 uses this threshold during classification to make a decision as to whether an e-mail is spam or not.

Once the processes of FIGS. 7A-9 have been performed, duplicate detector 232 and e-mail classifier are initialized and ready to perform spam filtering on unknown e-mails by duplicate detection and classification (which are generally shown in FIGS. 3 and 4). FIGS. 10 and 11 show processes performed by duplicate detector 232 and e-mail classifier 236, respectively, to perform spam filtering by duplicate detection and classification. Specifically, FIG. 10 shows a process 1000 for implementing action 315 of FIG. 3, while FIG. 11 shows a process 1100 for implementing action 410 in FIG. 4.

Referring to FIGS. 3, 5, and 10, during the duplicate detection phase, in general, an incoming e-mail of unknown class is received by duplicate detector 232 (310). The unique attributes U in the incoming e-mail are determined (1005). The intersection between the unique attributes U and the lexicon L is then determined (i.e., the unique attributes U that are also in the lexicon L are determined) (1010). A query signature for the incoming e-mail is then calculated based on the intersection (1015). The query signature is then compared to the spam signatures to determine if the query signature matches a spam signature (320). If the query signature matches a spam signature, then the incoming e-mail is forwarded to e-mail handler 234 along with an indication that the incoming e-mail is spam (330). If the query signature does not match a spam signature, then the incoming e-mail is forwarded to e-mail classifier 236 for classification (325).

More particularly, and with reference to the long-and-short dashed reference line of FIG. 5, an incoming e-mail 510c is received by duplicate detector 232 and applied to attribute analyzer 530 (310). Attribute analyzer 530 determines the unique attributes U in the incoming e-mail (1005). Next, attribute analyzer 530 passes the unique attributes U to attribute selector/intersection filter 540. Attribute selector 540 determines the intersection between unique attributes U and the primary lexicon L (1010). To do so, attribute selector 540 accesses the lexicon L from lexicon storage 520. Attribute selector then filters the unique attributes U against the lexicon L to determine the unique attributes U that are also in lexicon L. The unique attributes U that are also in L form the intersection between U and L.

Attribute selector 540 then passes the intersection to signature generator 550. Signature generator 550 calculates the query signature for the incoming e-mail based on the intersection (1015). The query signature is then forwarded to a signature comparator 570. Signature comparator 570 accesses the spam signatures from spam signature storage 560 and compares the query signature to the spam signatures to determine if the query signature matches a spam signature (320).

The output of signature comparator 570 indicates whether the query signature matches a spam signature and is provided to mail forwarder 580. Mail forwarder 580 also receives the incoming e-mail. Based on the output of signature comparator 570, mail forwarder 580 forwards the incoming e-mail as appropriate. Particularly, if the signature comparator indicates the query signature matches one or more spam signatures, mail forwarder 580 forwards the incoming e-mail to e-mail handler 234 with an indication that the incoming e-mail is spam (330). On the other hand, if the output of signature comparator 570 indicates that the incoming e-mail does not match a spam signature, then the incoming e-mail is forwarded to e-mail classifier 236 for classification (325).

Referring to FIGS. 4, 6, and 11, e-mail classifier 236 operates in a classification phase (1100) to classify an incoming e-mail when the e-mail classifier 236 receives the incoming e-mail from duplicate detector 232 (405). In general, the incoming e-mail is analyzed to determine whether or not it contains the N attributes of the reduced attribute set (1110). This data is used to obtain a spam score and classification output for the e-mail (1115). The e-mail is classified by comparing the classification output to the classification threshold. The precise comparison scheme is a matter of design. As one example, if the classification output is equal to or above the classification threshold (1120), the e-mail is classified as spam (1125). If the classification output is below the classification threshold (1120), the e-mail is classified as legitimate (1130). If the incoming e-mail is classified as spam (415), then the incoming e-mail is forwarded to e-mail handler 234 along with an indication that the e-mail is spam (425). If the incoming e-mail is classified as legitimate (415), then the incoming e-mail is forwarded to e-mail handler 234 along with an indication that the e-mail is legitimate (430).

More particularly, and with reference to the long-and-short dashed reference line of FIG. 6, during the classification phase, the incoming e-mail 610c is received from duplicate detector 232 (405). The incoming e-mail is input to attribute analyzer 630. Attribute analyzer 630 determines whether or not the incoming e-mail has the N attributes of the reduced attribute set and constructs an N element attribute vector (1110). Each entry in the N element attribute vector is a binary value that indicates whether the $N^{th}$ attribute is present in the incoming e-mail.

The N element attribute vector is input into classifier 650, which applies the internal classification model to the attribute vector to obtain a spam score that indicates the likelihood that the e-mail is spam and to produce a classification output (1115). The classification output is input to threshold comparator 670.

Threshold comparator 670 applies the comparison scheme (1120) and produces an output that indicates whether the e-mail is classified as spam (1125) or legitimate (1130). The output of threshold comparator 670 is applied to mail forwarder 680.

The incoming e-mail also is input to mail forwarder 680. When the output of threshold comparator 670 indicates the incoming e-mail is classified as spam (415), mail forwarder 680 forwards the incoming e-mail to e-mail handler 234 along with an indication that the e-mail is spam (425). When the output of threshold comparator 670 indicates the incoming e-mail is classified as legitimate (415), mail forwarder 680 forwards the incoming e-mail to e-mail handler 234 along with an indication that the e-mail is legitimate (430).

FIGS. 12A and 12B are flowcharts showing alternate processes performed by duplicate detector 232 for determining spam signatures and query signatures. Signature-based duplicate detection techniques that use lexicons may provide false positives when the intersection between the unique attributes U in a document and the lexicon is small, thereby decreasing the precision of the technique. For example, in the I-Match approach, when the intersection between the set of unique words in a document and the lexicon of words is small, the words used to generate the signature may only be a small portion of the document and, therefore, not very representative of the document. This may result, for instance, in a long document that has the same or nearly the same intersection as a different, smaller document, and, consequently, the I-Match approach may indicate that the longer document is the same as the smaller document, even if this is not the case. In other words, in the I-Match approach, for example, the signature of a document is defined as a hashed representation of the intersection S=(L∩U) (where L is the lexicon and U is the unique words in a document) and this signature becomes unreliable when $$\frac{|S|}{|U|}$$

becomes too small.

To mitigate such effects, a secondary lexicon of attributes (which may be less effective in identifying a given document) may be used to supplement a primary lexicon of attributes when the projection of the document onto the primary lexicon of attributes is below a certain threshold.

Accordingly, in process 1200, when the attribute information 505 is received from attribute reducer 640 (1205), the attribute information 505 is used to generate a primary lexicon of attributes L and a secondary lexicon of attributes B (1210). For example, when the mutual information criterion is used by attribute reducer 640, the attributes are ranked according to their mutual information scores (if not done so already) and the attributes with the top M scores are designated as the lexicon L. The remaining attributes then may be designated as lexicon B.

Referring to FIG. 12B, secondary lexicon B is then used to supplement primary lexicon L when the spam signatures and query signatures are generated. In process 1220, for a given spam or incoming e-mail d, duplicate detector 232 determines the unique attributes U in e-mail d (1225). When generating spam signatures, e-mail d is one of the e-mails in the set of known spam e-mails. On the other hand, when generating query signatures, e-mail d is the incoming e-mail.

Next, duplicate detector 232 determines the intersection between unique attributes U and the primary lexicon L (i.e., duplicate detector 232 determines which attributes in U are also in the primary lexicon L) (1230). The intersection is then evaluated to determine if it is above a certain threshold (1235). The threshold may be, for example, a minimum number of attributes that is common between the unique attributes U and the primary lexicon L and/or a minimum proportion of common attributes to the attributes contained in U. For example, the intersection between the unique attributes U and the primary lexicon L may be required to contain at least a threshold number of attributes (e.g., 5 attributes) or must be at least a threshold proportion or percentage (e.g., 10%) of the unique attributes U, whichever is greater. The value of the threshold is generally a matter of design and may be chosen by the system designers through trial and error, with the threshold selected to obtain a target precision of the system.

If the intersection is below the threshold (1235), then attributes from secondary lexicon B that also intersect with the unique attributes U are included in the intersection to achieve an intersection above the threshold (1240). For example, attributes that also intersect with unique attributes U may be included from lexicon B in decreasing order of their MI score until the threshold is reached. This augmented intersection is then used to calculate the signature for e-mail d (1245) by applying an algorithm that generates a signature to the augmented intersection. On the other hand, if the original intersection is above the threshold, then the original intersection is used to calculate the signature for e-mail d (1245) by applying an algorithm that generates a signature to the original intersection.

If there is another e-mail in the set of known spam e-mails or another incoming e-mail (1250), then process 1220 moves to action 1225 to find the unique attributes in the other e-mail and the process continues as described above. Otherwise, process 1220 is ended and the signatures are used as spam signatures or compared to a spam signature as a query signature (1255).

The techniques described above are not limited to any particular hardware or software configuration. Rather, they may be implemented using hardware, software, or a combination of both. The methods and processes described may be implemented as computer programs that are executed on programmable computers comprising at least one processor and at least one data storage system. The programs may be implemented in a high-level programming language and may also be implemented in assembly or other lower level languages, if desired.

Any such program will typically be stored on a computer-usable storage medium or device (e.g., CD-Rom, RAM, or magnetic disk). When read into the processor of the computer and executed, the instructions of the program cause the programmable computer to carry out the various operations described above.

A number of implementations have been described. Nevertheless, it will be understood that various modifications may be made. For example, attribute reducer 640 or lexicon generator 515 may further reduce the attributes used for classification or in the lexicon by grouping "similar" attributes into a smaller set of attribute-clusters and using the attribute clusters as the attributes. For example, when the attributes are words, then similar words may be grouped into a smaller set of word-clusters, which are then used as the attributes. The attributes may be clustered into "similar" attributes by a distributional attribute clustering technique. For example, the Agglomerative Information Bottleneck (IB) algorithm may be used. The IB technique chooses attribute clusters so as to maximize the mutual information between attribute clusters and classes, while insuring that relevant properties of the original attribute distribution are preserved by the new representation. The IB technique is described in N. Slonim and N. Tishby, "The Power of Word Clusters for Text Classification," in 23rd *European Colloquium on Information Retrieval Research,* 2001, incorporated herein by reference. Another suitable technique for forming word or other attribute clusters is described in L. Baker and A. McCallum, "Distributional Clustering of Words for Text Classification," in *Proceedings of SIGIR-98, 21st ACM International Conference on Research and Development in Information Retrieval,* pages 96-103, 1998, incorporated herein by reference.

In such an implementation, attribute reducer 640 may further reduce the attributes by grouping the N selected attributes using, e.g., the IB technique. That is, attribute reducer 640 may calculate the mutual information score of the n attributes, rank the scored attributes, select the top N attributes, and then apply the IB technique to the N attributes to create attribute clusters. These attribute clusters are then used to create an A-by-m attribute cluster matrix. Each entry in the A-by-m matrix is a binary value that indicates whether the $A^{th}$ attribute cluster is present in the $m^{th}$ e-mail. The A-by-m matrix is then used by classifier 650 to generate the internal classification model.

For classification and optimization, the operation of attribute analyzer 630 is then adjusted to determine whether the incoming e-mail contains the A attribute clusters. Attribute analyzer 630 then constructs an A element attribute cluster vector for each e-mail, where each entry in the attribute cluster vector is a binary value that indicates whether the $A^{th}$ attribute cluster is contained in the incoming or evaluation e-mail. The attribute cluster vector is then used by classifier 650 to determine a classification output.

The attribute information 505 transmitted to duplicate detector 232 then may contain the attribute clusters. Lexicon generator 515 may then designate the lexicon as containing the attribute clusters or a subset of the attribute clusters. Attribute analyzer 530 is then modified to determine the unique attribute clusters in an e-mail. The intersection between the unique attribute clusters in the e-mail and the lexicon of attribute clusters is then determined and used to generate the signature for the e-mail.

As an alternative, attribute information 505 may contain the attributes and the information necessary to generate attribute clusters, instead of the attribute clusters themselves. In such a situation, lexicon generator 515 then may create the attribute clusters using a similar or different technique and use them as the lexicon.

As another alternative, e-mail classifier 236 may use attribute clusters while duplicate detector 232 does not. Instead, attribute reducer 640 may transmit the attribute information 505 including the attributes and, e.g., their respective mutual information scores to duplicate detector 232 and lexicon generator 515 may generate the lexicon from the attributes with the top M scores, as described above.

Similarly, duplicate detector 232 may use attribute clusters while e-mail classifier 236 does not. In this case, e-mail classifier 236 may use the top N attributes as described above and attribute information 505 may contain the attributes and the information necessary to generate attribute clusters. Lexicon generator 515 then may create the attribute clusters and use them as the lexicon.

The attribute clusters may be formed from all of the attributes, or only a portion of the attributes; for example, the textual portion of the attributes.

As an example of another modification, in some places in the foregoing description an action is described as performed on each e-mail; however, the performance of the actions on each e-mail is not necessarily required. For instance, with respect to spam signatures, a spam signature may not be obtained for each known spam e-mail because of certain restrictions placed on signatures, such as a requirement that the intersection be above a threshold before a signature is generated. Thus, if an intersection above a certain threshold can not be obtained for a particular spam e-mail, then the e-mail may be ignored and a signature not generated for it. Similarly, there may be restrictions on the number of unique attributes required. For instance, a spam e-mail may be required to contain a minimum number of unique attributes (e.g., 5) before it is used.

In addition, while described as classifying e-mail as either spam or legitimate, e-mail classifier 236 may be designed to classify e-mail into more than just those two classes. For instance, e-mail classifier may be designed and trained to classify e-mail not only as legitimate, but to further classify legitimate e-mail into one of a plurality of subcategories of legitimate e-mail. As an example, legitimate mail may have the following subcategories: personal, business related, e-commerce related, mailing list, and promotional. Personal e-mails are those that are exchanged between friends and family. Business related e-mails are generally those that are exchanged between co-workers or current and/or potential business partners. E-commerce related e-mails are those that are related to online purchases, such as registration, order, or shipment confirmations. Mailing list e-mails are those that relate to e-mail discussion groups to which users may subscribe. Promotional e-mail are the commercial e-mails that users have agreed to receive as part of some agreement, such as to view certain content on a web site.

Also, whether or not e-mail classifier 236 is specifically designed to classify legitimate e-mail into subcategories, classifier 236 may be designed to take into account the varying misclassification costs of misclassifying e-mail in a given subcategory of legitimate e-mail as spam. For instance, misclassifying a personal e-mail as spam typically is considered more costly than misclassifying a business related message as spam. But it may be considered more costly to misclassify a business related e-mail as spam than misclassifying a promotional e-mail as spam. These varying misclassification costs may be taken into account both during training and when setting the classification threshold.

Training a classifier to develop a classification model that takes into account such varying misclassification costs generally is known and described in A. Kolcz and J. Alspector, "SVM-based Filtering of E-mail Spam with Content-specific Misclassification Costs," *ICDM*-2001 *Workshop on Text Mining* (*TextDM*-2001), November 2001.

When setting the initial threshold, such varying costs can be taken into account by setting:

$$\text{cost} = \sum_{cat} P(cat \mid l, x) C(s, cat)$$

where P(cat|l,x) is the probability that a particular legitimate e-mail x belongs to the subcategory cat (e.g., personal, business related, e-commerce related, mailing list, or promotional) and C(s,cat) is the cost of misclassifying a legitimate e-mail belonging to the subcategory cat as spam.

The following is an exemplary list of subcategories cat and an exemplary cost C(s,cat) that may be used:

| Subcategory cat | Misclassification Cost C(s, cat) |
| --- | --- |
| Personal | 1000 |
| Business Related | 500 |
| E-commerce related | 100 |
| Mailing List Related | 50 |
| Promotional | 25 |

As another example of an alternative implementation; instead of using a threshold that fully minimizes the misclassification costs (i.e., reduces the misclassification cost to the minimized cost level), a threshold could instead be chosen that reduces the misclassification costs to a predetermined level above the minimized cost level.

Further, while an implementation that adjusts an initial classification threshold value has been shown, other implementations may adjust the classification output to achieve the same affect as adjusting the classification threshold, as will be apparent to one of skill in the art. Thus, in other implementations, instead of a threshold selector, a classification output tuning function may be used to adjust the algorithm for producing classification outputs from the spam or other class score to obtain the same effect as a change in the classification threshold value. To do so, the classification output tuning function may evaluate a number of algorithm adjustments and choose the one that results in minimum misclassification costs.

As yet another example, the foregoing description has described an e-mail classifier 236 and duplicate detector 232 that forwards e-mail to an e-mail handler 232 along with an indication of whether the e-mail is spam or legitimate. However, in some implementations, it may not be necessary to forward the e-mail at all. For instance, the e-mail classifier 236 or duplicate detector 232 may be designed to handle the e-mail appropriately based on the e-mails classification or whether the e-mail is a duplicate.

In addition, "classifying" a message does not necessarily have to include explicitly marking something as belonging to a class or providing an explicit indication that something belongs to a class. Rather, classifying may simply include providing the message with a classification output. A message then may be handled differently based on its score. For example, e-mail classifier 236 may not include threshold comparator 670. Instead, classifier 650 marks the e-mail with the classification output and the e-mail with classification output is then forwarded by mail forwarder 680 to e-mail handler 234. E-mail handler 234 then may handle the e-mail according to the classification output. For example, a message may be displayed differently based on the classification output. A first message, for instance, may be displayed in a darker shade of red (or other color) than a second message if the classification output of the first message is higher than the classification output of the second message (assuming a higher classification output indicates a greater chance the message is spam).

Also, while a binary attribute representation is described for e-mail classifier 236, one of skill in the art will appreciate that other types of representations may be used. For example, a term frequency-inverse document frequency (tf-idf) representation or a term frequency (tf) representation may be used. Also, for non-text attributes, non-binary representations may additionally or alternatively be used. For example, if video or audio data is included, the attributes may include, respectively, color intensity or audio level. In this case, the color intensity or audio level attributes may be stored in a representation that indicates their levels, not just whether they exist or not (i.e., their analog values may be stored and used). In addition, attributes such as the time of day a message was received or sent may be used and stored as a real value.

Various phases and actions of the processes described may be performed online (i.e., while duplicate detector 232 and e-mail classifier 236 are receiving unknown e-mails for classification) or offline (i.e., when duplicate detector 232 and e-mail classifier 236 are not receiving unknown messages for classification). Typically, the spam signature development, training, and optimization phases (including threshold selection) may be performed offline, while the duplicate detection and classification phases are online phases. However, in some implementations, some actions may be performed dynamically while duplicate detector 232 and e-mail classifier 236 are online. For instance, threshold selection may be performed dynamically while e-mail classifier 236 is online to adjust the threshold based on characteristics of the incoming e-mail stream.

Furthermore, while shown as operating in series, in other configurations, duplicate detector 232 and e-mail classifier 236 may operate in parallel. In addition, other configurations may not only share attribute information from e-mail classifier 236 to duplicate detector 232, but also from duplicate detector 232 to e-mail classifier 236. In such cases, the attributes used by duplicate detector 232 and e-mail classifier 236 may be a compromise between methods particular to one or the other or both.

In other implementations where the foregoing techniques are applied to spam filtering in other messaging media or other areas of classification, the attributes may be other features of the particular items being classified. For instance, the attributes may be n-grams, image features, sound features, or features extracted from other forms of media.

Accordingly, other implementations are within the scope of the following claims.

What is claimed is:

1. A method comprising:
   receiving an electronic document;
   analyzing, using at least one processor, the electronic document to extract a number of first attributes from the electronic document, the number of first attributes selected from a first attribute set;
   obtaining a first classification output for the electronic document based upon the number of first attributes extracted from the electronic document;
   if the first classification output for the electronic document is above a first threshold, withholding delivery of the electronic document;
   if the first classification output for the electronic document is below the first threshold, analyzing the electronic document to extract a number of second attributes from the electronic document, the number of second attributes selected from a second attribute set, and obtaining a second classification output for the electronic document based upon the number of second attributes extracted from the electronic document;
   if the second classification output for the electronic document is above a second threshold, withholding delivery of the electronic document; and
   if the second classification output for the electronic document is below the second threshold, delivering the electronic document.

2. The method of claim 1, further comprising receiving a plurality of known spam electronic documents.

3. The method of claim 2, further comprising:
   analyzing each of the plurality of known spam electronic documents; and
   determining a plurality of unique attributes for each of the known spam electronic documents.

4. The method of claim 3, wherein the plurality of unique attributes comprise at least one of textual identifiers, hypertext markup language identifiers, or non-textual identifiers.

5. The method of claim 3, further comprising creating the first attribute set and the second attribute set based on the plurality of unique attributes determined from the plurality of known spam electronic documents.

6. The method of claim 3, further comprising associating a ranking with each of the plurality of unique attributes based on how indicative each of the plurality of unique attributes is of the likelihood of an electronic document being spam.

7. The method of claim 6, further comprising obtaining the first classification output and the second classification output for the electronic document based on the ranking associated with each of the number of attributes present in the electronic document.

8. The method of claim 1, further comprising:
   determining a weight associated with each of the number of first attributes;
   determining a weight associated with each of the number of second attributes;
   generating the first classification output for the electronic document based at least in part on the weight associated with each of the number of first attributes; and
   generating the second classification output for the electronic document based at least in part on the weight associated with each of the number of second attributes.

9. The method of claim 1, further comprising enabling a user to modify the first classification output and the second classification output for the electronic document.

10. The method of claim 1, wherein the electronic document comprises a video file.

11. A method comprising:
    generating, using at least one processor, a first attribute set and a second attribute set for use in classifying electronic documents;
    receiving an electronic document having an unknown query signature;
    analyzing the electronic document to determine whether the electronic document contains one or more attributes selected from the first attribute set;
    making a first determination as to whether the electronic document contains a number of attributes selected from the first attribute set above a first threshold;
    classifying the electronic document based on the first determination;
    if the electronic document does not contain a number of attributes selected from the first attribute set above the first threshold, analyzing the electronic document to determine whether the electronic document contains one or more attributes selected from the second attribute set;
    making a second determination as to whether the electronic document contains a number of attributes selected from the second attribute set above the second threshold; and
    classifying the electronic document based on the second determination.

12. The method of claim 11, further comprising assigning a query signature to the electronic document based on the classification of the electronic document.

13. The method of claim 12, further comprising:
    comparing the query signature of the electronic document with one or more query signatures of known spam electronic documents; and
    forwarding the electronic document based on whether the query signature of the electronic document matches the one or more query signatures of the known spam electronic documents.

14. The method of claim 11, further comprising associating a weight with each attribute in the first attribute set and with each attribute in the second attribute set, wherein each weight is indicative of the likelihood that an electronic document that contains the attribute is spam.

15. The method of claim 14, further comprising modifying the classification of the electronic document based on the weight of each attribute contained in the electronic document.

16. The method of claim 11, wherein the electronic document comprises an audio file.

17. The method of claim 11, further comprising enabling a user to modify the classification of the electronic document.

18. A system comprising:
    at least one processor; and
    at least one non-transitory computer readable medium storing instructions thereon that, when executed by at least one process, cause the system to:
    receive an electronic document;
    analyze the electronic document to extract a first number of attributes from the electronic document, the number of first attributes selected from a first attribute set;

obtain a first classification output for the electronic document based upon the number of first attributes extracted from the electronic document;

if the first classification output for the electronic document is above a first threshold, withhold delivery of the electronic document based;

if the first classification output for the electronic document is below the first threshold, analyze the electronic document to extract a number of second attributes from the electronic document, the number of second attributes selected from a second attribute set, and obtain a second classification output for the electronic document based upon the number of second attributes extracted from the electronic document;

if the second classification output for the electronic document is above a second threshold, withhold delivery of the electronic document; and if the second classification output for the electronic document is below the second threshold, deliver the electronic document.

19. The system of claim 18, wherein the at least one processor is further caused to:

receive a plurality of known spam electronic documents; and determine a plurality of unique attributes from the plurality of known spam electronic documents.

20. The system of claim 19, wherein the first attribute set and the second attribute set each comprise at least a portion of the plurality of unique attributes determined from the plurality of known spam electronic documents.

21. The system of claim 18, wherein the at least one processor is further caused to enable a user to modify the first classification output and the second classification output for the electronic document.

* * * * *